(12) United States Patent
Ong et al.

(10) Patent No.: US 11,376,798 B2
(45) Date of Patent: Jul. 5, 2022

(54) METHOD FOR INTERLAYER FEEDBACK CONTROL AND FAILURE PREVENTION IN AN ADDITIVE MANUFACTURING PROCESS

(71) Applicant: Origin Laboratories, Inc., San Francisco, CA (US)

(72) Inventors: Joel Ong, San Francisco, CA (US); Christopher Prucha, San Francisco, CA (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 16/984,102

(22) Filed: Aug. 3, 2020

(65) Prior Publication Data

US 2021/0031458 A1 Feb. 4, 2021

Related U.S. Application Data

(60) Provisional application No. 62/882,464, filed on Aug. 2, 2019.

(51) Int. Cl.
*B29C 64/393* (2017.01)
*B33Y 30/00* (2015.01)
(Continued)

(52) U.S. Cl.
CPC ............ *B29C 64/393* (2017.08); *B33Y 30/00* (2014.12); *B33Y 50/02* (2014.12); *B29C 64/124* (2017.08); *B33Y 10/00* (2014.12)

(58) Field of Classification Search
CPC ..... B29C 64/393; B29C 64/124; B33Y 30/00; B33Y 50/02; B33Y 10/00
See application file for complete search history.

(56) References Cited

U.S. PATENT DOCUMENTS 9,205,601 B2 12/2015 Desimone et al.
9,738,034 B2 8/2017 Gruber et al.
(Continued)

FOREIGN PATENT DOCUMENTS

EP 2837444 A1 2/2015
EP 2928670 B1 5/2016
WO 2019204258 A1 10/2019

OTHER PUBLICATIONS

International Search Report and Written Opinion for International Patent Application No. PCT/US2020/044803; dated Nov. 23, 2020; 11 pages.
(Continued)

*Primary Examiner* — Yung-Sheng M Tsui
*Assistant Examiner* — Melody Tsui
(74) *Attorney, Agent, or Firm* — Run8 Patent Group, LLC; Peter Miller; Ryan D. Smith

(57) ABSTRACT

An additive manufacturing system configured to: during a first build cycle of an additive manufacturing process for manufacturing a first layer of a build, sampling a first set of sensor data streams via the sensor suite; calculate a first likelihood of failure of the build based on the first set of sensor data streams; in response to calculating the first likelihood of failure within a first likelihood range, flag the build to indicate the first likelihood of failure; and in response to calculating the first likelihood of failure within a second likelihood range greater than the first likelihood range, pause the additive manufacturing process, and notify an operator of the additive manufacturing system of the first likelihood of failure.

2 Claims, 20 Drawing Sheets

(51) Int. Cl.
B33Y 50/02 (2015.01)
B29C 64/124 (2017.01)
B33Y 10/00 (2015.01)

(56) References Cited

U.S. PATENT DOCUMENTS

| | | |
|---|---|---|
| 2015/0045928 A1 | 2/2015 | Perez et al. |
| 2015/0177158 A1* | 6/2015 | Cheverton .............. B22F 10/20 |
| | | 700/119 |
| 2016/0107340 A1 | 4/2016 | Joyce |
| 2017/0050389 A1 | 2/2017 | Lee |
| 2017/0057174 A1 | 3/2017 | Megretski et al. |
| 2017/0151628 A1 | 6/2017 | Craig et al. |
| 2017/0239885 A1 | 8/2017 | Knecht et al. |
| 2017/0361527 A1 | 12/2017 | Saarikoski et al. |
| 2018/0029296 A1 | 2/2018 | Van Esbroeck et al. |
| 2018/0200948 A1 | 7/2018 | Kuijpers et al. |
| 2018/0264719 A1 | 9/2018 | Rolland et al. |
| 2018/0272606 A1 | 9/2018 | Chang et al. |
| 2018/0290373 A1 | 10/2018 | El-Siblani et al. |
| 2018/0322621 A1 | 11/2018 | Craeghs et al. |
| 2019/0111622 A1 | 4/2019 | Khalip |
| 2019/0134887 A1 | 5/2019 | Vadder |
| 2019/0202112 A1 | 7/2019 | Gmeiner |
| 2019/0275740 A1 | 9/2019 | Chang |
| 2019/0311822 A1 | 10/2019 | Perigo et al. |
| 2019/0351609 A1 | 11/2019 | Thau |
| 2020/0001525 A1* | 1/2020 | Wynne .................... B29C 64/20 |
| 2020/0031045 A1 | 1/2020 | Thompson et al. |

OTHER PUBLICATIONS

Notification of the International Application Number and of the International Filing Date for International Patent Application No. PCT/US2020/044803 dated Aug. 11, 2020; 1 page.

International Search Report received in PCT/2020/028783 dated Jul. 21, 2020.

Notice of Allowance received in U.S. Appl. No. 16/852,078 dated Aug. 11, 2020.

\* cited by examiner

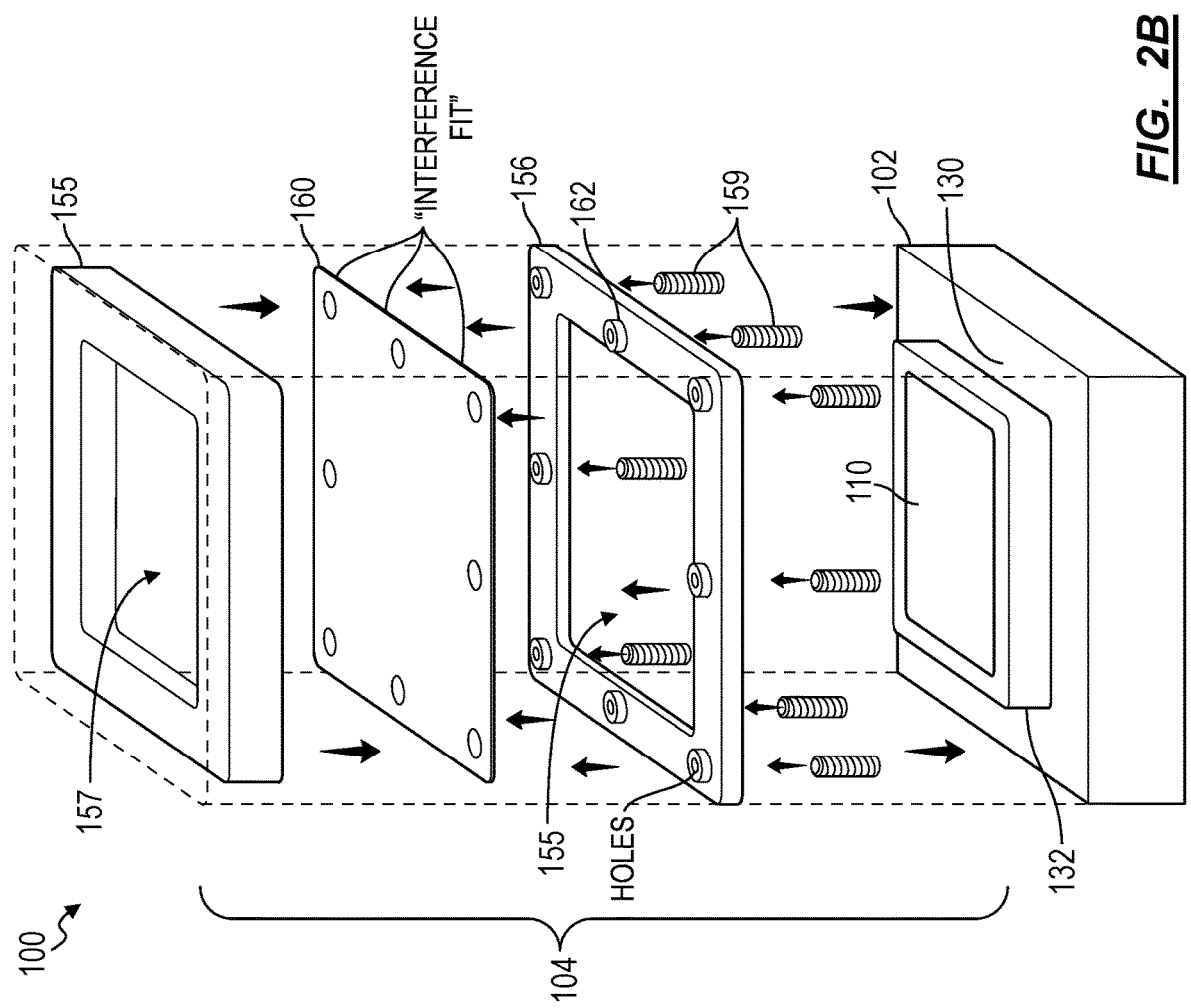

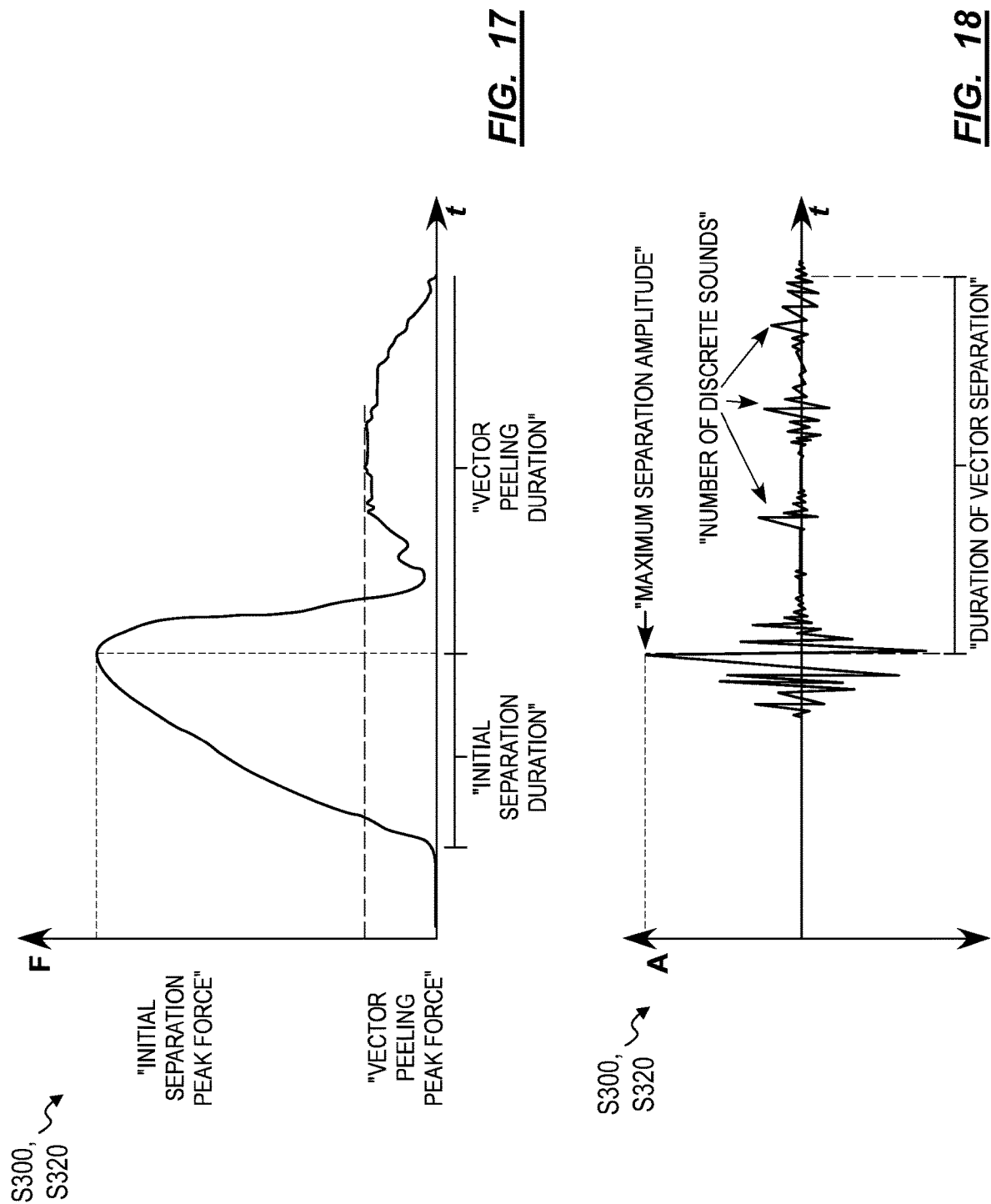

METHOD FOR INTERLAYER FEEDBACK CONTROL AND FAILURE PREVENTION IN AN ADDITIVE MANUFACTURING PROCESS

CROSS-REFERENCE TO RELATED APPLICATIONS

This application claims the benefit of U.S. Provisional Application No. 62/882,464, filed on 2 Aug. 2019, which is incorporated in its entirety by this reference.

This application is related to U.S. application Ser. No. 16/900,560, filed on Jun. 12, 2020, which is incorporated in its entirety by this reference.

TECHNICAL FIELD

This invention relates generally to the field of additive manufacturing and more specifically to a new and useful method for interlayer feedback control and failure detection in an additive manufacturing process in the field of additive manufacturing.

BRIEF DESCRIPTION OF THE FIGURES

FIGS. 2A and 2B are schematic representations of an additive manufacturing system;

FIG. 17 is a flowchart representation of one variation of the second method;

FIG. 18 is a flowchart representation of one variation of the second method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Additive Manufacturing Process

Figure 1:
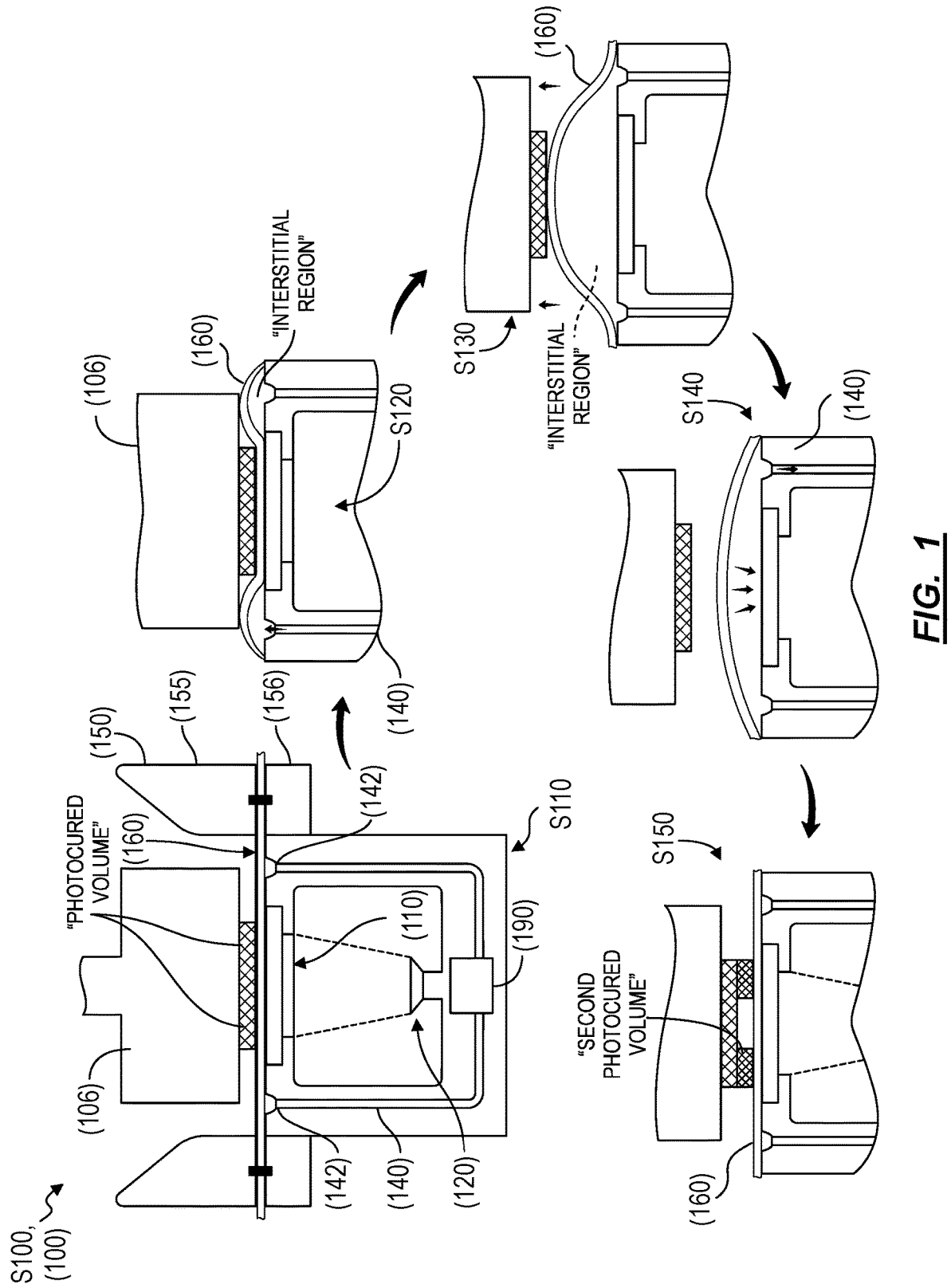
FIG. 1 is a flowchart representation of an additive manufacturing process.

As shown in FIG. 1, a first additive manufacturing process S100 includes: photocuring a first volume of resin to form a first layer of a build at an upper surface of a separation membrane laminated over a build window, the first layer of the build adhering to a build platform in Block S110; injecting a fluid into an interstitial region between the separation membrane and the build window in Block S120; retracting the build platform from the separation membrane in Block S130; evacuating the fluid from the interstitial region to peel the separation membrane from the first layer of the build in Block S140; and photocuring a second volume of liquid resin to form a second layer of the build between the upper surface of the separation membrane and the first layer of the build in Block S150.

Figure 9A:
FIGS. 9A, 9B, and 9C are flowchart representations of variations of the additive manufacturing process.
Figure 9B:
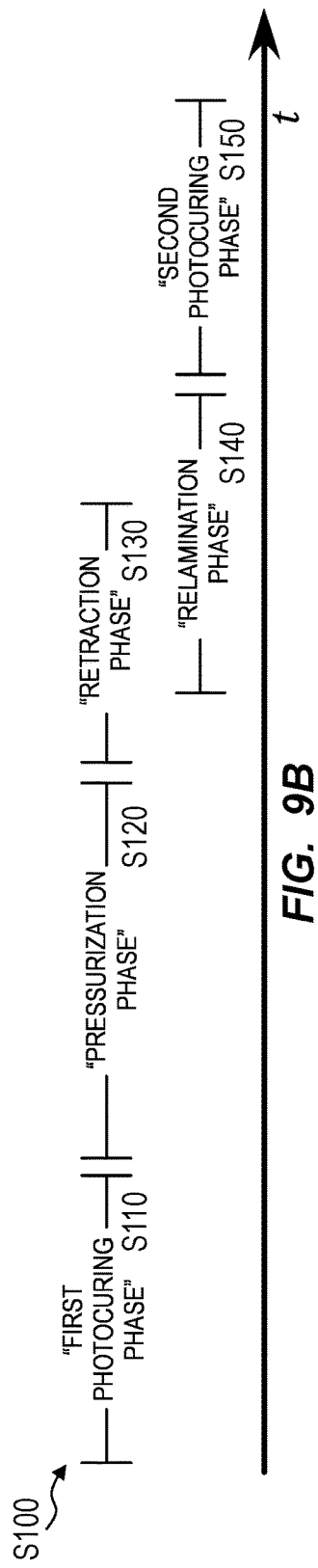
Figure 9C:
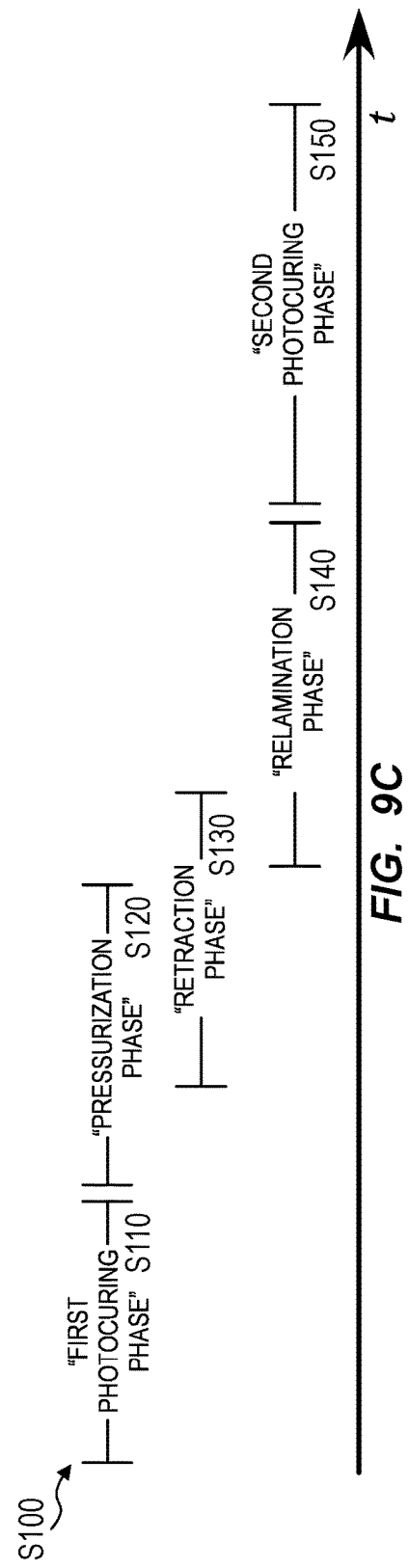

As shown in FIGS. 9A, 9B, and 9C, one variation of the additive manufacturing process S100 includes: during a first photocuring phase, photocuring a first volume of liquid resin to form a first layer of a build between an upper surface of a separation membrane laminated to a build window and a build platform in Block S110; during a pressurization phase subsequent to the first photocuring phase, injecting a fluid into an interstitial region between the separation membrane and the build window in Block S120; during a retraction phase, retracting the build platform from the build window in Block S130; during a relamination phase subsequent to the pressurization phase, evacuating the fluid from the interstitial region to peel the separation membrane from the first layer of the build and laminate the separation membrane to the build window in Block S140; and, during a second photocuring phase subsequent to the relamination phase, photocuring a second volume of liquid resin to form a second layer of the build between an upper surface of a separation membrane and the first layer of the build in Block S150.

2. Method for Interlayer Feedback Control in the Additive Manufacturing Process

Figure 10:
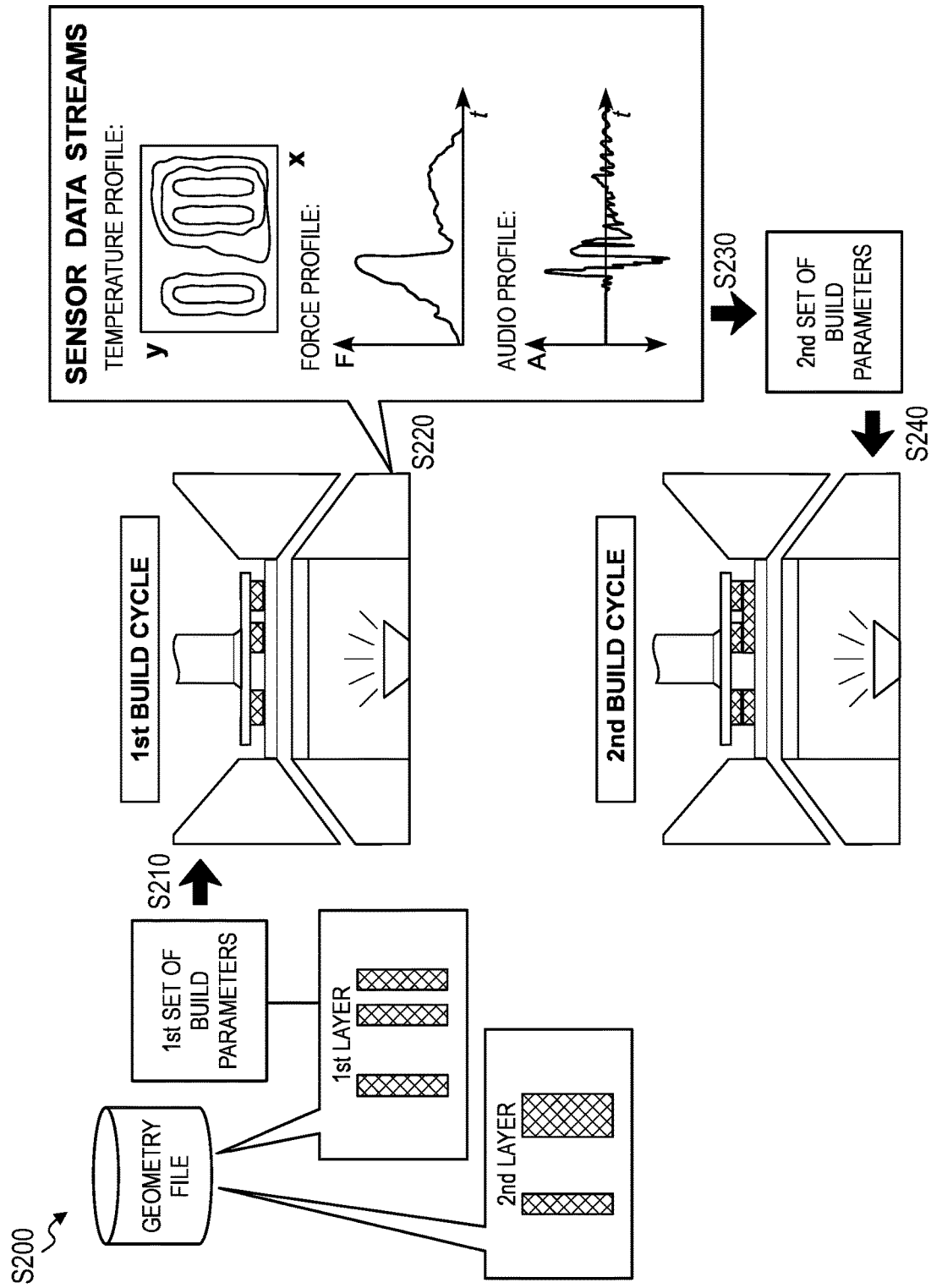
FIG. 10 is a flowchart representation of a first method.

As shown in FIG. 10, a first method S200 for interlayer feedback control in the additive manufacturing process S100 includes, accessing a geometry file of a build, the geometry file including a first layer geometry and a second layer geometry. The first method S200 also includes, during a first build cycle: manufacturing a first layer of the build according to a first set of build parameters and the first layer geometry, the first layer of the build adhering to a build platform in Block S210; and subsequent to manufacturing the first layer of the build accessing a set of sensor data streams captured during the first build cycle in Block S220. The first method S200 further includes: calculating a second set of build parameters based on the set of sensor data streams, the second layer geometry, and an interlayer feedback model in Block S230; and during a second build cycle, manufacturing a second layer of the build according to the second set of build parameters, the second layer of the build adhering to the first layer of the build in Block S240.

3. Method for Failure Detection in the Additive Manufacturing Process

Figure 15:
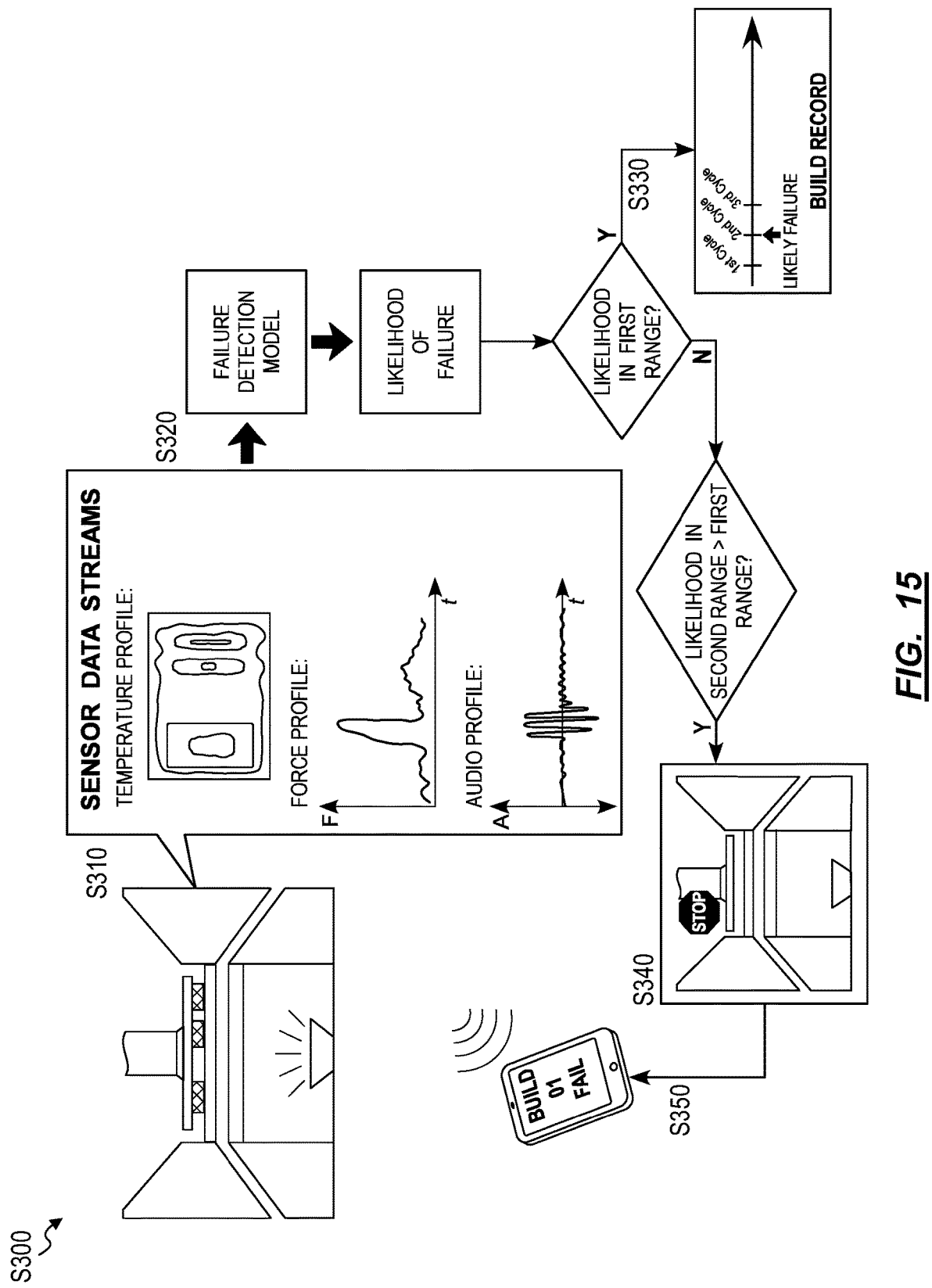
FIG. 15 is a flowchart representation of a second method.

As shown in FIG. 15, a second method S300 for failure detection in the additive manufacturing. g process S100 includes: during a first build cycle of an additive manufacturing process for manufacturing a first layer of a build, sampling a first set of sensor data streams via the sensor suite in Block S310; calculating a first likelihood of failure of the build based on the first set of sensor data stream in Block S320; and in response to calculating the first likelihood of failure within a first likelihood range, flag the build to indicate the first likelihood of failure in Block S330. The second method S300 also includes, in response to calculating the first likelihood of failure within a second likelihood range greater than the first likelihood range: pause the additive manufacturing process in Block S340; and notify an operator of the additive manufacturing system of the first likelihood of failure in Block S350.

4. Applications

Generally, the methods S200 and S300 can be executed by an additive manufacturing system (hereinafter the "system") to control and adjust build parameters in real-time and to detect build failure based on the specific geometry of a build and data collected by the system 100 during one or more build cycles of an additive manufacturing process S100. The system 100 can thus execute Blocks of these methods to improve material characteristics of the resulting build (e.g., elasticity or modulus of a resulting part), increase dimensional accuracy of the build, reduce manufacturing time to complete the build, and increase repeatability of the system 100 across multiple instances of this same build. More specifically, the system 100 can include a sensor suite configured to output sensor streams indicative of the state, equilibrium conditions, and varying conditions of the build, uncured resin, and the environment within the system 100, etc., which the system 100 can then interpret to trigger modifications to its operation and internal conditions in real-time and/or during a next build cycle of the additive manufacturing process. For example, the system 100 can: define a build chamber including a thermographic camera, a set of visible-light cameras, digital thermometers, oxygen concentration sensors, humidity sensors, depth sensors, load cells, and pressure sensors; and collect data from these sensors to construct a record of conditions present within the build chamber during a build (hereinafter "a build record"). The system 100 can then combine material characteristics of a material specified for the build—such as material properties in the resin phase and/or photocured phase of the material—and the build record within a model to inform real-time adjustment of build parameters inside in the build chamber, such as: separation speed of the build platform from the build window (shown in FIG. 2A); retraction speed of the build platform from the build window following separation; advancement speed of the build platform toward the build window in preparation for development of a next layer of the build; exposure duration of the next layer of the build (e.g., by a projection system); spatial or temporal energy distribution parameters, or any other per-layer build parameter.

Furthermore, the system 100 can calculate a likelihood of failure during a build (hereinafter a "build failure") in real-time based on the sensor data, mark the event in a build-record, notify an operator of the system 100, or cancel the remainder of the build according to the calculated likelihood of failure, thereby reducing wasted resin and wasted machine time of the additive manufacturing system and enabling an operator to restart the build or initiate a different build. The system 100 can then leverage the failure data to modify build parameters for the next build in order or to reduce probability of failure during this next build.

Upon recording build records for a large number of builds, the system 100 can also train and refine a failure prevention model—based on data collected during failed builds and successful builds—to predict failure of a build. The system 100 can then preemptively modify build parameters before or during a next build in order to reduce probability of failure predicted by the failure prevention model, such as to a target failure probability (e.g., 1%) that balances risk of failure with speed of production at the system 100.

In one example, the system 100 receives a selection of (or automatically detects) a build material and then accesses material characteristics of the build material prior to initiating a next build. For example, the system 100 can retrieve a temperature-viscosity curve, a critical energy, a specific heat, a specific gravity, a thermal expansion and/or contraction coefficient, a curing depth, a UV penetration depth of the uncured build material, and/or additional cure characteristic of the resin such as (chemical reaction thermodynamics, polymerization shrinkage characteristics, residual/latent cure characteristics post-exposure to electromagnetic radiation, edge-curing characteristics (e.g., molecular building at perimeters of cross-section geometries), and/or through-curing characteristics (e.g., interlayer binding characteristics). The system 100 can additionally or alternatively access material characteristics of the photocured material, such as a green strength-reaction temperature curve (i.e., relating green strength of the photocured material to temperature at which the resin was photocured), green strength-exposure intensity curve, and/or elasticity of the photocured material. The system 100 can also access a geometry of the build, such as in the form of a three-dimensional virtual model. The system 100 can then: define an initial set of build parameters for this next build based on these characteristics of the material, a target failure rate, and/or the geometry of the build; load these initial build parameters; initiate an additive manufacturing process; and implement closed-loop controls to execute these initial build parameters to cure a first layer of the build on the build platform. For example, the system 100 can define an initial bulk resin temperature based on a target viscosity for the uncured resin and a target green strength of the photocured build material, and an initial UV light intensity based on the critical energy of the build material and the depth of cure parameter of the build material.

During this first layer of the additive manufacturing process, the system 100 can sample sensors in the sensor suite and aggregate the data into a build record for the build. The system 100 can then, in real-time, implement an interlayer feedback model to adjust these build parameters based on the build record and properties of the resin material. The interlayer feedback model can include a number of sub-models capable of adjusting specific build parameters such as separation speed, retraction speed, retraction distance, advancement speed, exposure duration, and/or exposure delay based on the current and/or recent conditions in the build chamber; the geometry of the build. Therefore, in one example, the system 100 can track, in real-time, changes in the viscosity of the uncured resin based on the temperature of the uncured resin and adjust the retraction speed, advancement speed, and exposure delay in order to maintain build quality (e.g., any target characteristic of the build) by compensating for the change in viscosity.

Furthermore, the system 100 can detect, in near real-time, a failure of the build by leveraging the sensor data. For example, the system 100 can: access a thermographic image of the last layer of the build after this layer is exposed by the projection system. The system 100 can then detect whether the photocuring reaction of the last layer (or earlier layers)

actually occurred by: measuring a temperature distribution across the build window via the thermographic camera; calculating a predicted temperature distribution of the uncured resin across the build window according to a thermodynamic model; and interpreting a deviation—between the measured and predicted temperature distributions—as a failure of the photocuring reaction in the last layer of the build in response to the deviation exceeding a threshold deviation.

Additionally or alternatively, the system 100 can record multiple visible-light (e.g., color, RGB, CMYK) images of the build during a retraction operation of the current (or next) layer of the build; implement computer vision techniques to estimate a geometry of the build currently extending from the build platform; and compare the geometry of the build to an target geometry of the build (e.g., based on an STL file for the build) to isolate a geometry deviation. For example, the system 100 can include multiple (color) cameras facing the build chamber and defining fields of view that intersect the build platform when the build platform is retracted from the build window. The system 100 can thus trigger the images sensors to record two-dimensional images of the build platform when retracted following exposure of a layer of the build and then reconstruct these two-dimensional images into a three-dimensional point cloud (or depth map) that represents the current geometry of the build. The system 100 can then detect a deviation between this three-dimensional point cloud and the target geometry of the build and assess whether failure (e.g., mechanical failure) of the build has occurred based on presence and/or magnitude of this deviation. In response to detecting such a build failure, the system 100 can halt or cancel the current build and prompt an operator to prepare the system 100 to restart this build or initiate a different build, thereby reducing material consumption and increasing throughput of viable parts through the system 100. Alternatively, the system 100 can automatically restart the build process in response to detecting a build failure with high confidence.

Therefore, the system 100 can set build parameters for a build, adjust these build parameters in real-time during the build based on sensor data collected inside the build chamber, detect failure of the build in real-time, and develop a model to prevent future failure of similar builds in order to improve build speed, dimensional accuracy, and system consistency across builds.

5. Hardware

Figure 2A:
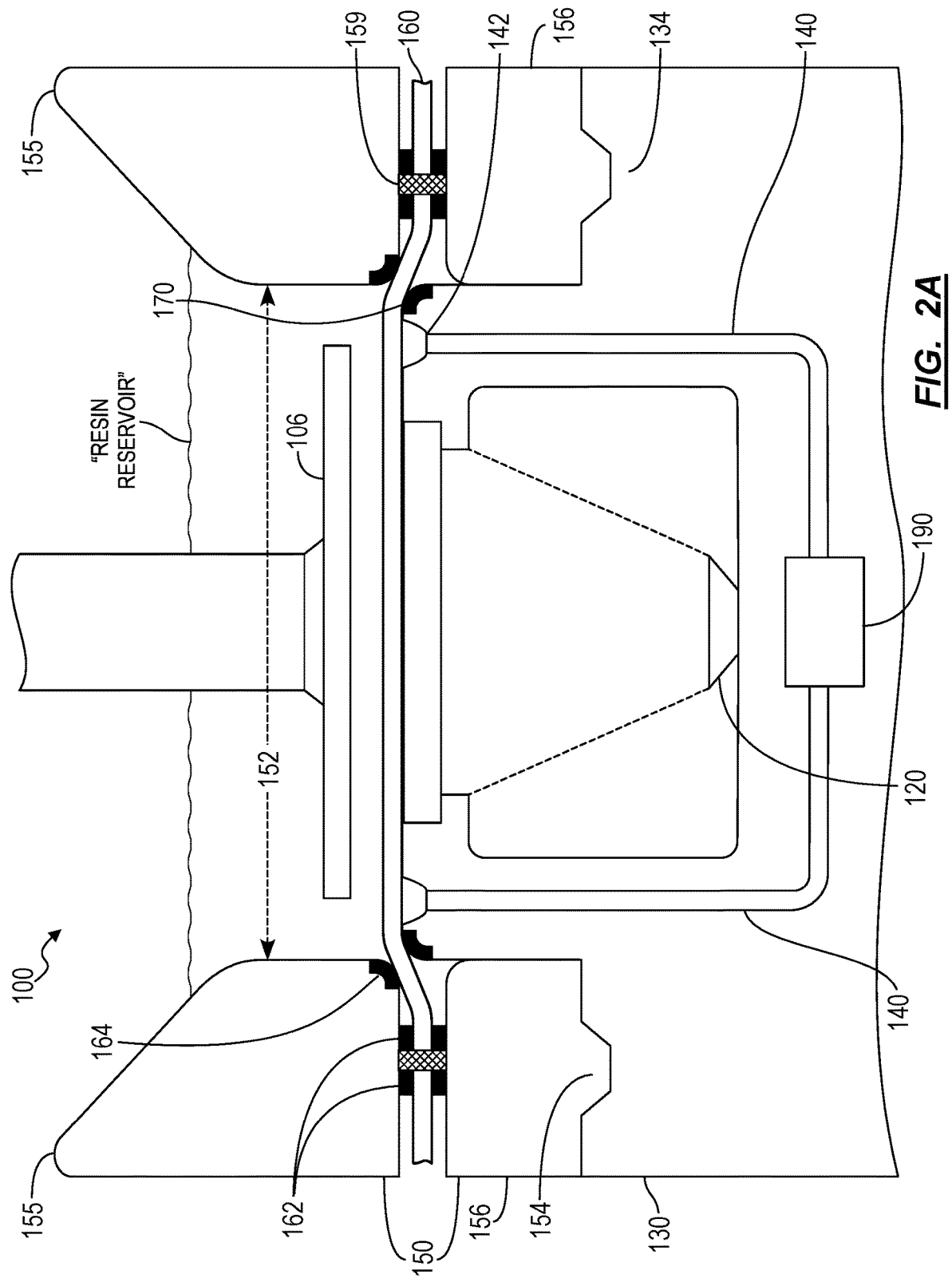

As shown in FIG. 2A, the system 100 includes two subassemblies of electromechanical components that, when engaged in an engaged configuration, can execute a "bottom-up" DLP process. Generally, the system 100 includes a base assembly 102 and a tray assembly 104. A user may: assemble the tray assembly 104 by inserting a separation membrane 160 into the tray structure 150; and engage the tray assembly 104 with the base assembly 102 before the system 100 executes the additive manufacturing process S100. The system 100 can then execute the additive manufacturing process S100 via an imbedded computational device running computer code (hereinafter the "controller"), which electronically actuates the build platform 106 (e.g., via a linear actuation system) and controls the projection system 120 and the pressure regulation system 190 to selectively cure volumes of resin and to separate these cured volumes of resin from the build window no and separation membrane 160.

The system 100, in executing Blocks of the additive manufacturing process S100, proceeds through multiple physical arrangements of the components in order to cure a build (e.g., a set of physical, three-dimensional objects) from the resin contained within the tray assembly 104. In a lamination phase, the system 100 reduces the pressure (i.e. draws a vacuum/evacuates fluid from) in the interstitial layer between the separation membrane 160 and the build window 110, thereby fully laminating the separation membrane 160 against the build window 110 and preventing formation of bubbles or wrinkles that may disrupt the reference surface for the system 100. During the lamination phase, the system 100 can execute Block Silo of the method in order to photocure a selective volume of resin above the laminated surface of the separation membrane 160. Subsequent to completion of Block Silo, the system 100 can execute a separation process including a pressurization phase, a retraction phase, and a relamination phase, corresponding to Blocks S120, S130, and S140 respectively. In the pressurization phase the system 100 injects fluid into the interstitial region, thereby generating separation between the separation membrane 160 and the build window 110 in order to reduce adhesion forces (e.g., Stefan adhesion, suction forces) between the newly cured layer of the build and the build window 110. In the retraction phase, the system 100 actuates the build platform 106 upward and away from the build window no: to separate the separation membrane 160 from the build window no; to peel the separation membrane 160 from the newly cured layer of the build; and to make space to photocure a successive layer of resin. In the relamination phase, the system 100 evacuates fluid from the interstitial region in order to peel the separation membrane 160 from the newly cured layer of the build and to relaminate the separation membrane 160 against the build window no in preparation for curing a successive layer of the build. Thus, the system 100 can repeat this process cycle to cure successive layers of the resin, thereby constructing a three-dimensional build.

5.1 Base Assembly

The system 100 includes a base assembly 102, which acts as the primary assembly resembling a three-dimensional printer. The base assembly 102 includes a projection system 120, a window platform 132, a build window no, a fluid distribution port 140 and/or a fluid distribution channel 142, a gasket system, a pressure regulation system 190, a tray seat 130, a build platform 106, and a controller. The base assembly 102 can be a free-standing structure that may be placed on a level surface for best printing results. The free-standing structure of the base assembly 102 links the aforementioned components in a calibrated arrangement that ensures consistent alignment between the projection system 120 and the build window no and parallelism between the reference plane of the build window no, the surface of the retractable build platform 106, and the focal plane(s) of the projection system 120. The structure of the base assembly 102 can be manufactured from any rigid material that does not significantly deform under the weight of the base assembly 102 or the stresses involved during repetitive build cycles.

The base assembly 102 can also include a build chamber, into which the tray assembly 104 may be loaded (e.g., via engagement with the tray seat 130), and a hatch to provide access to this build chamber. The base assembly 102 can further include systems configured to control the environment within the build chamber (e.g., such as an auxiliary pressure regulation system 190 and/or a set of heating elements).

5.1.1 Projection System

The projection system 120 is upward facing, is housed in the base assembly 102, and can include one or more projectors configured to project electromagnetic radiation in an emissive spectrum, which can include the ultraviolet (hereinafter "UV"), visible, or near infrared (hereinafter "NIR") spectrum. The projection system can emit electromagnetic radiation in one or more wavelength bands tuned to the chemical and physical properties of the resin and its specific curing process. For example, the projection system 120 (e.g., a digital projection system) can project electromagnetic radiation in an emissive spectrum of 300-nanometer to 450-nanometers. The projection system 120 is electrically coupled to the controller; receives potentially software-modified frames corresponding to full or partial cross-sections of a three-dimensional model of the build; and projects electromagnetic radiation through the build window no and separation membrane 160 in the engaged configuration (and during the photocuring phase) to selectively photocure volumes of the resin according to build parameters and the received frames.

In one variation, the system 100 can include a projection system 120, which further includes a set of light sources, such as projectors or other electromagnetic emitting devices. In this variation, each irradiation source of the projection system 120 can define a projective area within the build window 110 in order to maintain a higher resolution across the build window no via tiling or stitching techniques. Additionally or alternatively, each light source can define a separate emissive spectrum enabling the projection system 120 to project electromagnetic radiation within multiple combinations of spectral bands.

In one variation, the projection system 120 includes a UV or near-UV laser and scans (e.g., as a raster) a laser beam across the build window no according to frames received from the controller in order to selectively photocure a volume of resin located over the separation membrane 160.

5.1.2 Window Platform

Generally, the window platform 132 extends upwards from a tray seat 130 of the base assembly 102 and is configured to align within a tray aperture 152 of the tray assembly 104 when the system 100 is in the engaged configuration. The window platform 132 is a rigid structure that encompasses the projection system 120 and defines an opening above the upward facing projection system 120 that is spanned by the build window 110. The upper surface of the window platform 132 defines a horizontal reference plane which is coincident with the upper surface of the build window 110 and the primary focal plane of the projection system 120. The system 100 can include a window platform 132 of a shape that: corresponds to a shape of a tray aperture 152; enables engagement with the separation membrane 160; and is configured to define fluid distribution ports 140 and/or fluid distribution channels 142 around the build window 110 and within the interstitial region. For example, the upper surface of the window platform 132 can define a circular shape, a rectangular shape, or any other shape depending on the target shape of the tray aperture 152. In an additional example, the system 100 can include a window platform 132 of any size larger than the build region of the system 100 and/or the dimensions of builds to be manufactured by the system 100. The system 100 can include a window platform 132 with filleted corners and edges around the upper surface of the window platform 132 to prevent tearing of the separation membrane 160 as it is tensioned over the window platform 132.

The window platform 132 defines an opening that is spanned or partially spanned by the build window no. Generally, the shape and size of the opening defined by the window platform 132 roughly corresponds with the shape and size of the upper surface of the build window no in order to maximize utilization of the build region of the system 100.

5.1.3 Build Window

The build window no is mounted to the window platform 132 such that the upper surface of the build window no is approximately flush with the upper surface of the window platform 132 and further defines the horizontal reference plane for builds manufactured in the system 100. The build window 110 is arranged above the projection system 120 and aligned with the projection area of the projection system 120 such that the focal plane of the projection system 120 coincides with the upper surface of the separation membrane 160 laminated over the build window 110. Generally, the build window 110 is substantially transparent (e.g., exhibiting greater than 85% transmittance) to the emissive spectrum of the projection system and thus passes electromagnetic radiation output by the projection system 120 into the resin above the build window 110 and separation membrane 160. The build window 110 also functions as a rigid support and reference surface for the separation membrane 160 and a layer of resin arranged thereover. The build window no is statically mounted to a base assembly 102, via the window platform 132, that can include the projection system 120, the build platform 106, the fluid distribution port 140, the pressure regulation system 190, and/or the build chamber to ensure repeatable, accurate alignment between the build window no and the rest of the base assembly 102. The interface between the rigid window platform 132 and the build window no is also gas-impermeable such that a pressure gradient, such as 300 kilopascals, can be sustained across the build window no.

The base assembly 102 can include a build window no manufactured from a pane of transparent, rigid glass, such as amorphous/silicate or crystalline/ceramic glass. In particular, the build window no can be both transparent to ultraviolet (or other) light output by the projection system 120 and can be substantially rigid, hard, and temperature-stable to form a robust, flat reference surface that supports the separation membrane 160 and that may exhibit minimal deflection or deformation during multiple build cycles, thereby yielding high and consistent build quality.

In one variation, the base assembly 102 can include a build window no that is transmissive to infrared (hereinafter "IR") radiation such that a thermographic sensor positioned below the build window no can accurately calculate the temperature of the resin during a during the photocuring phase of the build cycle.

5.1.4 Fluid Distribution Ports

The base assembly 102 includes one or more fluid distribution ports 140 configured to fluidically (i.e. pneumatically or hydraulically) couple the pressure regulation system 190 to the interstitial region between the separation membrane 160 and the build window 110, thereby enabling the pressure regulation system 190 to inject and/or evacuate fluid from the interstitial region while the system 100 is in the engaged configuration. The fluid distribution ports 140 can therefore be located within a gasket system that forms a seal between the base assembly 102 and the tray assembly 104 and, more specifically, between the build window no and the separation membrane 160. Each fluid distribution port 140 can define an opening that is fluidically coupled to the pressure distribution system 100 to enable the system 100 to adjust the pressure within the interstitial region via the pressure distribution port by injecting and/or evacuating fluid from the fluid distribution ports 140. In one implementation, the system 100 includes an inlet fluid distribution port 140 and an outlet fluid distribution port 140, which provides an inlet for fluid entering the interstitial region and an outlet for fluid evacuating from the interstitial region respectively. Alternatively, the base assembly 102 includes a single fluid distribution port 140, which is configured with the pressure regulation system 190 as both an outlet and an inlet for fluid in the interstitial region. In another implementation, the base assembly 102 can include additional fluid distribution ports 140 arranged throughout the interstitial region in order to reduce asymmetrical fluid flow from one side of the interstitial region to another.

5.1.5 Fluid Distribution Channel

In one variation, the base assembly 102 includes a fluid distribution channel 142 intersecting the fluid distribution ports 140 and configured to distribute fluid evenly throughout the interstitial region. More specifically, the base assembly 102 can include a fluid distribution channel 142 configured to reduce asymmetrical fluid flow relative to the build window 110 and the separation membrane 160 by distributing fluid from a fluid distribution port 140 throughout the interstitial region. Thus, when fluid is injected into or evacuated from the interstitial region, the entire region is pressurized and/or depressurized substantially simultaneously, thereby preventing bubble formation in the separation membrane 160 or uneven separation of the separation membrane 160 from the build during the retraction and/or relamination phase.

In one implementation, the fluid distribution channel 142 is integrated within the window platform 132 supporting the build window 110 and defines a channel inset into the upper surface of the rigid window platform 132. In this implementation, the fluid distribution channel 142 is arranged circumferentially around the perimeter of the build window no and intersects an inlet fluid distribution port 140 and an outlet fluid distribution port 140 fluidly coupled to the pressure regulation system 190. Thus, the base assembly 102 can include a fluid distribution channel 142 circumscribing the build window no and configured to distribute fluid evenly in the interstitial region.

However, the base assembly 102 can include a fluid distribution channel 142 defining any path throughout the interstitial region that reduces asymmetrical fluid flow within the interstitial region.

5.1.6 Pressure Regulation System and Pressure Chambers

Figure 4:
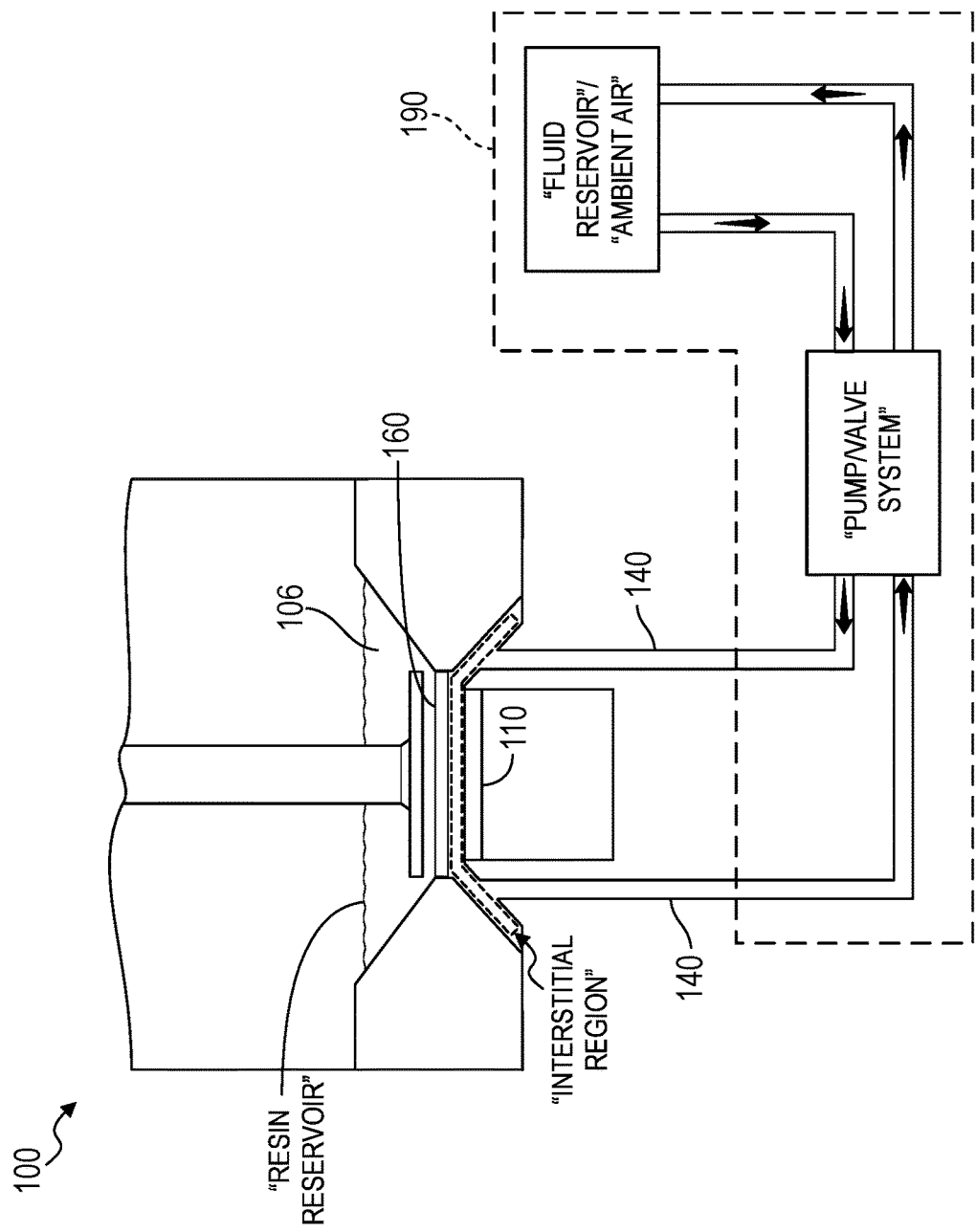
FIG. 4 is a schematic representation of one variation of the additive manufacturing system.

Generally, as shown in FIG. 4, the base assembly 102 can include a pressure regulation system 190 configured to pressurize and/or depressurize by injecting and/or evacuating fluid from the interstitial region in accordance with the additive manufacturing process S100. More specifically, the base assembly 102 can include a pressure regulation system 190 that is: fluidically coupled to the fluid distribution port 140; configured to inject fluid into the interstitial region to separate the separation membrane 160 from the build window 110 in the engaged configuration and during a pressurization phase; and configured to evacuate fluid from the interstitial region to laminate the separation membrane 160 to the build window 110 in the engaged configuration and during a lamination phase.

The pressure regulation system 190 can include a pump (e.g., a diaphragm pump) and a set of electromechanical valves connected by a set of tubes to the fluid distribution ports 140. More specifically, the pressure regulation system 190 can include a pump fluidically coupled to a set of two electromechanical valves configured to actuate in response to commands from the system 100 and direct fluid flow through the pump into the interstitial region or out of the interstitial region based on a current phase of the build cycle.

In one implementation, the pressure regulation system 190 includes a set of electronically actuated valves configured to regulate flow between a compressed fluid supply line (e.g., a compressed air supply line in the building housing the system) and a central vacuum line. The system 100 can, therefore, be connected—such as via external ports—to the compressed fluid supply line and the central vacuum line.

In another implementation, the pressure regulation system 190 includes a compressor system 100 (e.g., a centrifugal compressor) and an external air port and is configured to: intake ambient air via the external air port; compress this ambient air; and inject this ambient air into the interstitial region. The pressure regulation system 190 can also evacuate air from the interstitial region via the compressor and the external air port by running the compressor system 100 in reverse. Alternatively, the pressure regulation system 190 is fluidly coupled to a fluid reservoir (e.g., a tank containing an inert fluid). Thus, the system 100 can inject fluid from the fluid reservoir into the interstitial region or evacuate this fluid into the fluid reservoir via the pressure regulation system 190.

In yet another implementation, the base assembly 102 can include a compressor system 100 and/or a system 100 of electronically actuated valves configured to draw fluid from the pressurized build chamber (e.g., above the surface of the resin reservoir contained in the build tray) in order to pressurize the interstitial region in the pressurization phase. Likewise, the system 100 can evacuate fluid from the interstitial region back into the build chamber during the relamination phase and/or the lamination phase. Thus, in this implementation, the system 100 can operate independently from external sources of a working fluid for pressurization or depressurization of the interstitial region.

Additionally or alternatively, the base assembly 102 can include a second pressure regulation system 190 configured to control the pressure of the build chamber independent from the pressure of the interstitial region. The system 100 can coordinate the first pressure regulation system 190 and the second pressure regulation system 190 to improve separation (e.g., reduce separation forces and increase separation speed) of the separation membrane 160 from the cured resin layer of the build.

The pressure regulation system 190 can maintain a maximum operating inflation differential pressure up to or exceeding 300 kilopascals and can pull a vacuum (e.g., a maximum operating deflation pressure) greater than 200 kilopascals. These pressures are sufficient to adequately separate the separation membrane 160 from the build window 110 in the pressurization phase and to laminate the separation membrane 160 to the build window 110 in the lamination and/or the lamination phase. However, the pressure regulation system 190 can maintain alternative operating differential pressures based on the volume of the interstitial region and the force exerted on the interstitial region by the separation membrane 160 due to the particular elasticity and thickness of the separation membrane 160.

5.1.7 Tray Seat

The base assembly 102 can define a tray seat 130 around the base of the window platform 132 with a surface offset below the upper surface of the window platform 132 such that the window platform 132 protrudes upwards from the center of the tray seat 130. The tray seat 130 defines a surface with a high degree of parallelism with the reference plane defined by the window platform 132. Additionally, the vertical offset between the tray seat 130 and the reference plane can be calibrated and/or constructed with a low tolerance such that, when the tray assembly 104 is seated at the tray seat 130 of the base assembly 102 in the engaged configuration, the separation membrane 160 is precisely positioned relative to the build window no. In one variation, the system 100 includes a tray seat 130 and tray assembly 104 tolerance stack that positions the separation membrane 160 slightly above (e.g., less than 1 millimeter above) the build window no when there is no pressure gradient across the separation membrane 160. In another variation, the system 100 defines a tray seat 130 and tray assembly 104 tolerance stack that positions the upper surface of the window platform 132 and/or build window no such that these surfaces protrude into the tensioned separation membrane 160 while the system 100 is in the engaged configuration, thereby automatically laminating the separation membrane 160 against the build window no.

The tray assembly 104 can define a set of registration features 154 corresponding to complimentary reference features 134 arranged on the tray seat 130 of the base assembly 102. Therefore, in the engaged configuration, the registration features 154 can constrain the tray assembly 104 relative to the base assembly 102. In one implementation, the reference features 134 of the base assembly 102 and the registration features 154 of the tray assembly 104 are configured to kinematically align the tray assembly 104 relative to the base assembly, thereby maintaining a precise offset between the separation membrane 160 and the build window no and/or preventing movement of the tray assembly 104 relative to the base assembly 102 during the build cycle. In another implementation, the base assembly 102 can include imbedded magnetic features underneath the tray seat 130 in order to bias the tray assembly 104 downward onto the reference features 134 of the tray seat 130. Alternatively, the base assembly 102 can include a set of mechanical clamps or screws in order to seat the tray assembly 104 at the tray seat 130 of the base assembly 102.

5.1.8 Reference Features

Generally, the reference features 134 defined by the tray seat 130 are configured to correspond to matching features in the tray assembly 104 and to thus align the tray assembly 104 with the base assembly 102. More specifically, the base assembly 102 can define positive reference features 134 or negative reference features 134 on the tray seat 130. Alternatively, the base assembly 102 can include reference features 134 that are separate components configured to install onto the tray seat 130. In combination with a biasing force, such as a magnetic force between corresponding magnetic features in the base assembly 102 and tray assembly 104, mechanically applied force securing the tray assembly 104 to the base assembly 102, and/or the force of gravity pulling the tray assembly 104 downward onto the base assembly 102, the reference features 134 kinematically constrain the tray assembly 104 relative to the base assembly 102 in all six degrees-of-freedom. Thus, corresponding reference features 134 defined in the tray seat 130 and in the tray assembly 104 can repeatably and accurately align the tray assembly 104 with the base assembly 102 when the tray assembly 104 is engaged with the base assembly 102.

5.1.9 Build Platform

Generally, the base assembly 102 also includes a vertically mobile build platform 106 to which a first layer of the build adheres and from which the build is suspended toward the build window no during the build cycle. More specifically, the base assembly 102 can include a build platform 106 defining a planar surface opposite and substantially parallel to the upper surface of the build window no; and a linear actuation system (including a single linear actuator or multiple timed linear actuators) configured to vertically translate the build platform 106 relative to the build window no. In one implementation, the system 100 can include a build platform 106 defining negative features, such as channels or through holes to improve the flow of resin out from under the build platform 106 during advancement of the build platform 106 into the resin reservoir and to facilitate the removal of the build from the build platform 106 after completion of the build.

The build platform 106 is a vertically actuating surface opposite the build window no. The system 100 can include a linear actuation system (with increments as small as 0.1 microns) mechanically coupled to the build platform 106. Additionally, during actuation of the linear actuation system, the controller: can track forces applied by the linear actuation system to the build platform 106 (e.g., based on a current draw of the linear actuation system or by sampling a force sensor, strain gauge, or load cell coupled to the build platform 106); and implement closed-loop techniques to control movement of the linear actuation system in order to achieve a particular distribution of separation forces between the newly cured layer of the build and the separation membrane 160 (e.g., to sweep this separation force along a predefined force profile once per layer). Thus, during the build cycle the linear actuation system lowers the build platform 106 to specific heights above the separation membrane 160 such that photocured resin adheres to the build surface of the build platform 106 facing the window. As the system 100 selectively cures successive layers of the build according to Blocks of the additive manufacturing process S100, the system 100 can retract the build platform 106 upward by a first distance in order to separate the current layer of the build from the separation membrane 160 and then advance the build platform 106 downward—by a second distance less than or equal to the first distance—in preparation for curing a successive layer of the build.

5.1.10 Controller

The base assembly 102 of the system 100 can include a controller that controls the electromechanical components of the system 100 in order to execute Blocks of the additive manufacturing process S100, the first method S200, and the second method S30. Generally, the controller is an imbedded computer system that sends instructions to the projection system 120, the pressure regulation system 190, and the linear actuation system coupled to the build platform 106, to execute the additive manufacturing process S100. In one implementation, the controller controls and receives instructions from a user interface, which can be a touchscreen or a set of buttons, switches, nobs, etc. Alternatively, the controller can communicate with and receive instructions from an external computational device. In another implementation, the controller is connected to a network, such as the internet, and is configured to receive instructions over the network. Additionally, the controller can send commands, in the form of digital and/or analog electrical signals, in order to actuate various electromechanical components of the system such as the magnetic locking mechanism, a door hatch release to the build chamber, the purge valves, and/or lighting elements within the build chamber. Furthermore, the controller can receive data from sensors integrated with the system 100 and execute feedback control algorithms based on these data in order to modify the function of the projection system 120, the pressure regulation system 190, and/or the linear actuation system.

5.2 Tray Assembly

As shown in FIG. 2B, the system 100 includes a tray assembly 104 (i.e. a build tray) which further includes: a tray structure 150 (which can define an upper member 155 and a lower member 156), a separation membrane 160, a set of tensioning gaskets 162, and/or a resin-sealing gasket 164. The tray assembly 104 is configured to engage (e.g., kinematically mount to) the base assembly 102 over the window platform 132 via corresponding registration features 154 arranged on the underside of the tray structure 150 and reference features 134 on the tray seat 130. Generally, the tray assembly 104 contains the resin reservoir during a build cycle and positions and maintains the tension in the separation membrane 160 over the window platform 132, build window no, and/or fluid distribution ports 140. More specifically, the tray assembly 104 can include a tray structure 150 that defines an upper member 155 and a lower member 156, which are fastened together via a set of fasteners with the separation membrane 160 in between the upper member 155 and the lower member 156. Thus, the tray structure 150 functions to position the separation membrane 160 so that it is configured to: laminate across the upper surface of the build window no in response to an evacuation of fluid, via the fluid distribution port 140, from an interstitial region between the base assembly 102 and the tray assembly 104 in the engaged configuration; and configured to separate from the build window no in response to injection of fluid, via the fluid distribution port 140, into the interstitial region.

In one implementation, the base assembly 102 includes a sealed build chamber that encloses the tray assembly 104 and sealed. Additionally, the build chamber can be filled with an inert fluid, such as to enable use of reactive (e.g., reactive with oxygen) resin chemistries in the system 100. In one implementation, the build chamber is integrated with the upper member 155 of the tray structure 150. In this implementation, the resin can be injected into the inner volume of the assembly including the build tray and the build chamber via an injection port such that the resin is not exposed to the atmosphere at any point while being loaded into the tray assembly 104.

5.2.1 Tray Structure

Generally, the tray structure 150: defines a tray aperture 152 spanned by the separation membrane 160 and circumscribing the build window no; defines registration features 154 configured to engage with the reference features 134 of the tray seat 130; and defines an interior volume for containing the resin reservoir. The tray structure 150 can be constructed from a rigid, non-reactive, temperature stable solid material, such as aluminum or another metal or metal alloy. In one implementation, the tray structure 150 is constructed from milled aluminum. Additionally, the tray assembly 104 can be a member of a set of tray assemblies associated with the system 100, each tray assembly 104 in the set of tray assemblies including a tray structure 150 of a different shape or size in order to accommodate a wider variety of build sizes and shapes. In one implementation, the tray structure 150 includes an upper member 155 and a lower member 156 configured to fasten to each other via a set of fasteners. Thus, during assembly of the tray assembly, a user may arrange the separation membrane 160 between the lower member 156 and the upper member 155, thereby repeatably locating the separation membrane 160 relative to the tray seat 130 in the engaged configuration.

Generally, the upper member 155 of the build tray defines the volume occupied by the resin during the build cycle and the region within which the system 100 can selectively photocure this resin into the build via execution of a series of build cycles. The upper member 155 also defines a tray aperture 152 that corresponds to the window platform 132 such that the upper member 155 can be lowered over the window platform 132 of the base assembly 102. The tray aperture 152 in the upper member 155 is spanned by the separation membrane 160 thereby enclosing the volume defined by the upper member 155 from the bottom. Thus, the tray assembly 104 when fully assembled defines an interior volume above the separation membrane 160 tensioned across the tray aperture 152, the interior volume configured to contain a reservoir of resin.

In one implementation, an inner surface of the build region is rounded to reduce stress concentrations in the separation membrane 160. In one implementation, the upper member 155 of the build tray defines a rounded rectangular build region. Additionally, the upper member 155 can define an inner surface that extends upward and perpendicular to the build window 110. The inner surface then expands upward and outward in a conical shape, wherein the vertical cross section of the conical inner surface has dimensions proportionally similar to the vertical cross-section of the perpendicular inner surface. Thus, the perpendicular and conical sections of the inner surface define a volume configured to contain the resin reservoir. However, the upper member 155 of the build tray can define any rounded internal volume. Additionally, the upper member 155 can include integrated heating and/or cooling elements. The system 100 can activate the heating and/or cooling elements to adjust the temperature of the resin within the build tray to near an optimal temperature for the photocuring reaction of the resin.

The lower member 156 defines a shape consistent with the inner surface of the upper member 155 and can define corresponding features to the reference features 134 in the tray seat 130 of the base assembly 102. In one implementation, the base assembly 102 and/or the lower member 156 contain magnets (i.e. magnetic registration features 154), which kinematically align the lower member 156, and therefore the tray assembly 104, to the base assembly 102 by biasing the lower member 156 against the reference features 134 in the base assembly 102. The lower member 156 also defines holes such that fasteners, such as screws or bolts, passing through the holes can insert into corresponding holes in the upper member 155. Alternatively, the system can include fasteners that are directly integrated with either the upper member 155 and/or the lower member 156 and the system can include an upper member 155 and a lower member 156 configured to slot directly into the opposite member of the tray structure 150.

5.2.2 Separation Membrane

The separation membrane 160 can include a transparent, thin, and flexible film or sheet characterized by low adhesion to photocuring resins. The separation membrane 160 is manufactured at sizes specific to particular tray assemblies 104 and with holes aligned with tensioning posts 159 extending from either the upper member 155 or the lower member 156 of the build tray. Thus, the separation membrane 160 is positioned between the upper member 155 and the lower member 156 of the build tray such that the tensioning posts 159 extend from one member of the tray structure 150, through a hole, slot, or perforation in the separation membrane 160, and into corresponding negative features in the opposite member of the tray structure 150. Additionally or alternatively, the separation membrane 160 can define a set of holes and/or slots such that there is an interference fit between the separation membrane 160 and the set of tensioning posts 159, thereby preloading (i.e. automatically tensioning) the separation membrane 160 with a tensile stress.

Thus, the tray assembly 104 can include an upper member 155 and a lower member 156 with interlocking features and a separation membrane 160 perforated in an interference fit with these interlocking features. Therefore, the geometry of the tensioning posts 159 relative to the corresponding perforations in the separation membrane 160 functions to automatically tension the separation membrane 160 across the tray aperture 152 defined by the tray structure 150. For example, the upper member 155 of the tray structure 150 can define milled positive features including the tensioning posts 159 corresponding to milled negative features in the lower member 156 such that the negative features of the lower member 156 fit over the positive features of the upper member 155. In this example, the separation membrane 160 defines perforations corresponding to the positive features of the upper member 155 in an interference fit. In this implementation, the tray assembly 104 can further include separate fasteners—such as magnets, clasps, latches, and/or screws—to fasten the lower member 156 to the upper member 155.

However, the separation membrane 160 can be tensioned across the tray aperture 152 defined by the tray structure 150 in any other way (e.g., via direct bonding to the tray structure 150 or via another fastening configuration).

Thus, in one implementation, the tray assembly 104 can include: an upper member 155 defining a set of positive features including a set of tensioning posts 159; a lower member 156 defining a set of negative features configured to engage with the set of positive features; a separation membrane 160 arranged between the upper member 155 and the lower member 156 and defining a third set of perforations outwardly offset from the set of tensioning posts in an interference fit between the separation membrane 160 and the set of tensioning posts 159 tensioning the separation membrane 160 via the interference fit.

5.2.3 Tensioning Gaskets

In one implementation, the upper member 155 and the lower member 156 include a set of rubber or rubberized plastic gaskets arranged around each tensioning post 159 to distribute tensile force applied to the separation membrane 160 over a larger area, thereby preventing excessive lateral movement/shifting or tearing of the separation membrane 160 while under tension. The tensioning gaskets 162 effectively sandwich the separation membrane 160 to bear the load of the tension in the membrane across the entire area of the gasket. In addition, the tray assembly 104 can include tensioning gaskets 120 configured to achieve a particular distribution (e.g., an even distribution) of tensile forces across the membrane and a particular inflationary profile or behavior of the separation membrane 160 (e.g., similar separation of the membrane independent of location within the build region). Thus, the tensioning gaskets 162 can be arranged on the bottom surface of the upper member 155 and/or the upper surface of the lower member 156 around the holes defined for the tensioning posts 159 in the upper member 155 and the lower member 156.

5.2.4 Resin-Sealing Gasket

The system 100 can also include a resin-sealing gasket 164 arranged along the edge of the tray aperture 152 of the upper member 155 of the build tray. Generally, the resin-sealing gasket 164 prevents resin ingress between the upper member 155 of the build tray and the separation membrane 160. Thus, when the tray assembly 104 is lowered over and around the window platform 132, the separation membrane 160 is tensioned and pulled upward by the window platform 132 protruding through the inner opening of the build tray spanned by the separation membrane 160. The separation membrane 160 is thus biased against the resin-sealing gasket 164 on the edge of the interior opening of the upper member 155 of the build tray creating a seal against resin held in the build tray. Additionally, the resin-sealing gasket 164 can prevent excess shear stress from tearing the separation membrane 160 when it comes into contact with the interior edge of the upper member 155 of the build tray.

In implementations where the separation membrane 160 is not pulled upward by a protruding window platform 132 in the engaged configuration (e.g., in implementations where the separation membrane 160 is positioned less than one millimeter above the build window 110 in the engaged configuration when there is no pressure gradient across the separation membrane 160), the tray assembly 104 can include a set of resin-sealing gaskets 164 circumscribing the tray aperture 152 in between the separation membrane 160 and the upper member 155 of the tray structure 150.

5.3 Sensor Suite

Generally, the system can include a sensor suite that includes: temperature sensors (e.g., digital thermometers, thermistors, thermocouples, thermographic image sensors), pressure sensors (e.g., barometers), force sensors (e.g., load cells, strain gauges), accelerometers, gyroscopes, magnetometers, vibration sensors, proximity sensors, light intensity sensors, microphones, image sensors (e.g., multispectral or visible light), oxygen concentration sensors, humidity sensors, and depth sensors. Therefore, the system can monitor conditions within the build chamber that are relevant to target build characteristics, such as target material characteristics, target dimensional accuracy, and/or target build duration. By recording particular conditions within the build chamber, the system 100 can execute Blocks of the first method S200 to adjust build parameters in response to data streams captured via the sensor suite. Additionally or alternatively, the system 100 can execute Blocks of the second method S300 to detect build failure based on data streams captured via the sensor suite.

In one implementation, the sensor suite includes a set of temperature sensors configured to capture the ambient temperature of the build chamber, the bulk temperature of the resin in the build tray, and/or the resin temperature at the resin interface of the separation membrane. Additionally or alternatively, the sensor suite can include thermographic image sensors configured to detect a spatial distribution of these temperatures across the aforementioned locations in the build chamber. For example, the system 100 can include a thermographic image sensor that can detect the spatial temperature distribution across the resin interface at which the photocuring reaction occurs during the photocuring phase of the additive manufacturing process S100.

In another implementation, the sensor suite includes a set of force sensors configured to detect force applied to the build platform during retraction phase or the advancement phase of the additive manufacturing process S100. For example, the set of force sensors can detect forces generated by the linear actuator of the build platform acting against suction and/or adhesion forces between the build window and the separation membrane and between the separation membrane and the most recently photocured layer of the build. In another example, the set of force sensors can detect force applied by the advancement of the build platform and adhered build into the volume of resin in the build tray prior to initiation of a subsequent build cycle. Thus, the system 100 can detect whether successful separation of the build from the separation membrane has occurred during each build cycle according to Blocks of the second method S300 and/or adjust retraction- and advancement-related build parameters for successive build cycles according to Blocks of the first method S200.

In yet another implementation, the sensor suite can include a set of pressure sensors configured to detect pressure (e.g., differential or absolute) within the build chamber and/or within the interstitial region between the separation membrane and the build window. Thus, the system 100 can detect whether successful inflation of the separation membrane 160 has occurred during each build cycle according to Blocks of the second method S300 and/or adjust inflation-related build parameters for successive build cycles according to Blocks of the first method S200.

In yet another implementation, the sensor suite can include a set of microphones configured to detect sounds and vibrations occurring within the build chamber during a build cycle of the additive manufacturing process S100. Thus, the system 100 can compare audio between build cycles of the additive manufacturing process S100 in order to detect changes in the efficacy of separation of the build from the separation membrane and the separation membrane from the build window according to Blocks of the second method S300.

In yet another implementation, the sensor suite can include a set of image sensors positioned within the build chamber or below the build window configured to capture images of the build during each build cycle. Thus, the system can analyze these images and compare these images to target geometries in order to determine geometric build failures or a reduction in dimensional accuracy according to Blocks of the first method S200 or the second method S300. In one example, the sensor suite includes an image sensor mounted within the build chamber and defining a field of view encompassing the build upon retraction (e.g., complete or partial retraction) of the build platform relative to the build window no. In another example, the sensor suite includes an image sensor arranged adjacent to the projection system 120 and defining a field of view that encompasses the build window. Thus, in this example, the system 100 can compare images captured by the image sensor with the target cross-sectional geometry of each layer of the build.

In yet another implementation, the sensor suite can include a set of humidity sensors and/or oxygen concentration sensors configured to capture the humidity and oxygen concentration of the gaseous environment within the build chamber. Thus, the system can detect whether build failure has occurred or is likely to occur upon detecting that the humidity or oxygen concentration with the build chamber outside of a target range corresponding to the resin material.

In yet another implementation, the sensor suite can include a set of depth sensors configured to detect the depth of the resin within the tray assembly 104. Thus, the system 100 can modify advancement of the build platform 106 toward the build window 110 based on the depth of the resin in the tray assembly 104, thereby preventing deformation of the build upon contact with viscous resin contained within the tray assembly 104 during the advancement phase of the additive manufacturing process S100.

6. Engagement and Initialization

Figure 3A:
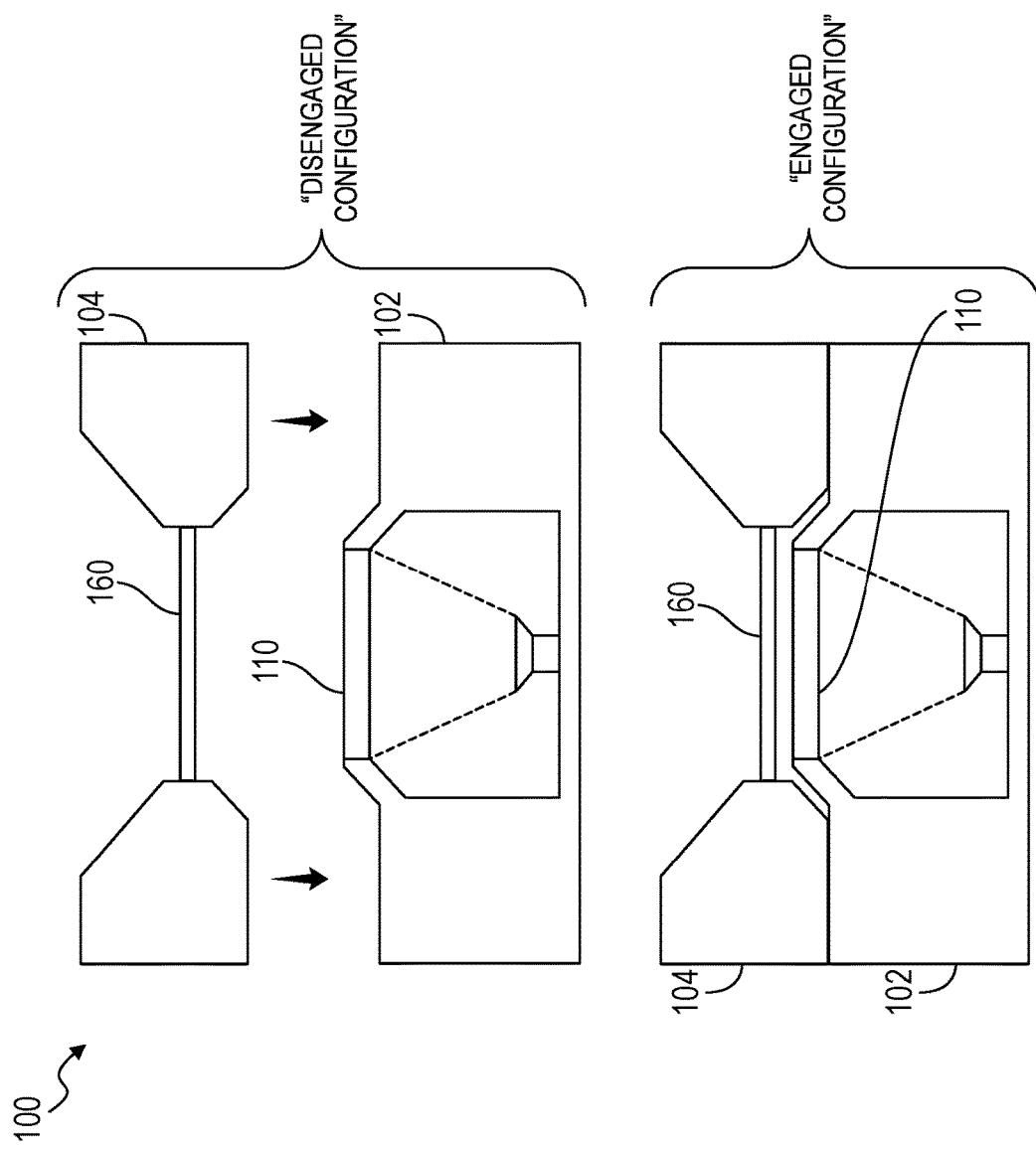
FIGS. 3A and 3B are schematic representations of variations of the additive manufacturing system.
Figure 3B:
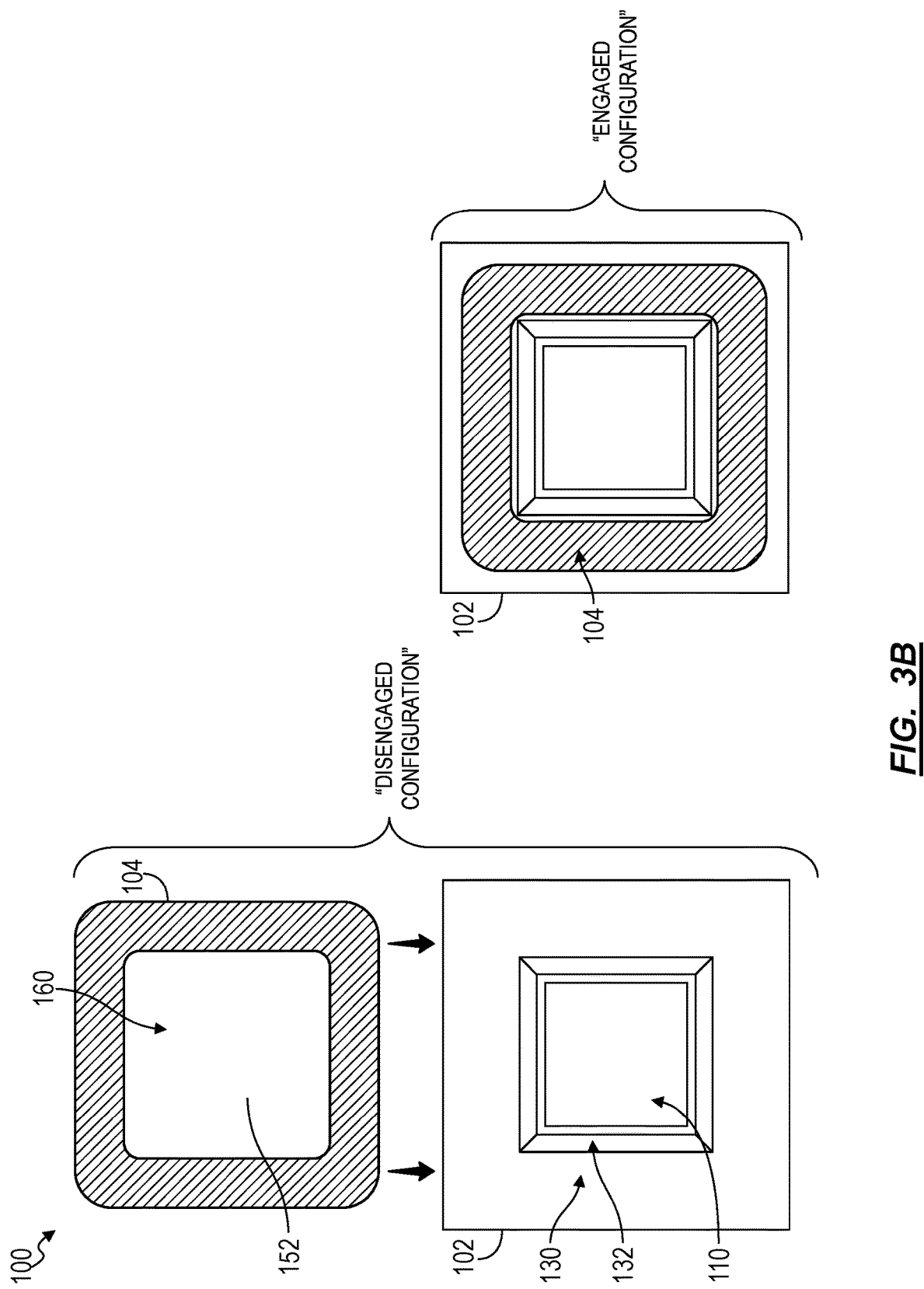

As shown in FIG. 2B, before the system 100 executes the additive manufacturing process S100, the user may fasten the separation membrane 160 between the lower member 156 and upper member 155. Once the separation membrane 160 is fastened between the upper member 155 and lower member 156 of the build tray, the user may lower the tray assembly 104 over the upper surface of the window platform 132 and the build window no. As shown in FIGS. 3A AND 3B, the tray then kinematically aligns with the reference features 134 of the base assembly 102, thereby engaging with the base assembly 102. In the passive lamination variation, when the tray assembly 104 and the base assembly 102 are engaged the separation membrane 160 is tensioned flush against the surface of the build window no and covers the fluid distribution channel 142. In this variation, the separation membrane 160 also forms a fluid-impermeable seal (within the maximum operating pressure of the system) against an interstitial gasket 170 arranged along the edge of the window platform 132 or with the edge of the window platform 132 itself. In the active lamination gasket variation of the system, the separation membrane 160 is positioned just above the build window no upon kinematic alignment of the tray assembly 104 with the tray seat 130 of the base assembly 102.

Before or after the tray assembly 104 is engaged with the base assembly 102, resin is loaded into the volume defined by the upper member 155 of the build tray and the separation membrane 160. If the resin is not sensitive to oxygen and/or ambient air, the resin may be poured directly into the build tray. However, if the resin is sensitive to oxygen, humidity, and/or ambient air, the resin can be injected into a tray assembly 104 through a sealed port in a sealed build chamber after the build chamber has been filled with an inert fluid.

Thus, after loading is complete, the build volume defined by the inner surface of the build tray is at least partially occupied by a volume of resin. The resin is in contact with the upper surface of the separation membrane 160 and the inner surface of the upper member of the tray assembly 104. However, the resin does not come into contact with the build window 110 underneath the separation membrane 160.

7. Build Cycle

Generally, as shown in FIG. 1 and referenced above, the system 100 executes Blocks S110, S120, S130, and S140, to: selectively photocure a volume of resin corresponding to a layer of a build; separate the separation membrane 160 from the build window 110, and also the newly cured layer of the build from the separation membrane 160; and reposition the separation membrane 160 and build platform 106 (adhered to the first layer) in preparation for photocuring a subsequent layer. More specifically, the system 100: cures a first layer of the build; inflates the interstitial region between the separation membrane 160 and the build window 110; retracts (e.g., raises) the build platform 106 vertically upward away from the build window 110; and depressurizes the region between the separation membrane 160 and the build window 110 in order to peel the separation membrane 160 away from the first layer of the build and draw the separation membrane 160 down onto and flat against the build window no. In one implementation, the system 100 can also advance/reposition the build platform 106 (and the adhered first layer of the build) such that the lower surface of the most recently cured layer of the build is offset from the surface of the separation membrane 160 (that is laminated across the build window no) by a distance equal to a target layer thickness of the next layer as shown in Block S142.

Additionally, as is further described below, the system 100 can execute Blocks S120, S130, S140 and/or S142 in a synchronized sequence—such as during discrete or (partially-) overlapping time periods—in order to repeatably separate layers of the build, including the newly cured layer of the build from the separation membrane 160 and with minimal damage or deformation of the build in its green state.

Furthermore, some Blocks of the additive manufacturing process S100 may be described with reference to a "first layer" of the build. However any of the Blocks of the additive manufacturing process S100 are also applicable to subsequent layers of the build.

Each iteration of the Blocks Silo, S120, S130, and S140 is collectively referenced to as a "build cycle" and are also included in Block S210 of the first method S200.

7.1 Build Chamber and Resin Reservoir Conditions

In one implementation, prior to executing Block Silo, the system 100 can adjust the temperature and pressure of the gas within the build chamber, and/or adjust the temperature of the resin in the resin reservoir.

For example, the system 100 can heat the resin in the reservoir (e.g., via heating elements integrated with the tray structure 150 or under the build window 110) in order to decrease the viscosity of the resin or cause a phase change in the resin from solid to liquid, thereby improving print speeds and printability of the resin. More specifically, the system 100 can access a target temperature for the resin based on a temperature-viscosity curve corresponding to the resin and a target viscosity for the resin; and heat the resin to the target temperature.

In another example, the system 100 can increase the temperature of the gas environment within the build chamber to match the target temperature for the resin in order to prevent convective currents from forming within the build chamber and therefore increasing evaporation rates of chemical components of the resin (which may degrade the performance of the resin). The system 100 can also heat the gas environment within the build chamber to prevent solidifying of resin surrounding a build in its green state after being retracted out of a heated resin bath, in implementations where the system maintains the resin in a liquid phase due to the elevated temperature of the resin reservoir. Additionally, the system 100 can control the temperature of the build chamber to prevent deformation of the build in its green state when exposed to differential pressures between the resin reservoir and the gas environment within the build chamber.

Furthermore, the system 100 can increase the pressure within the build chamber to reduce the evaporation rate of chemical components of the resin. In yet another example, the system 100 can introduce an inert fluid environment within the build chamber when the system 100 is photocuring especially reactive resin chemistries (e.g., oxygen-sensitive resin chemistries).

7.2 Lamination

Figure 5:
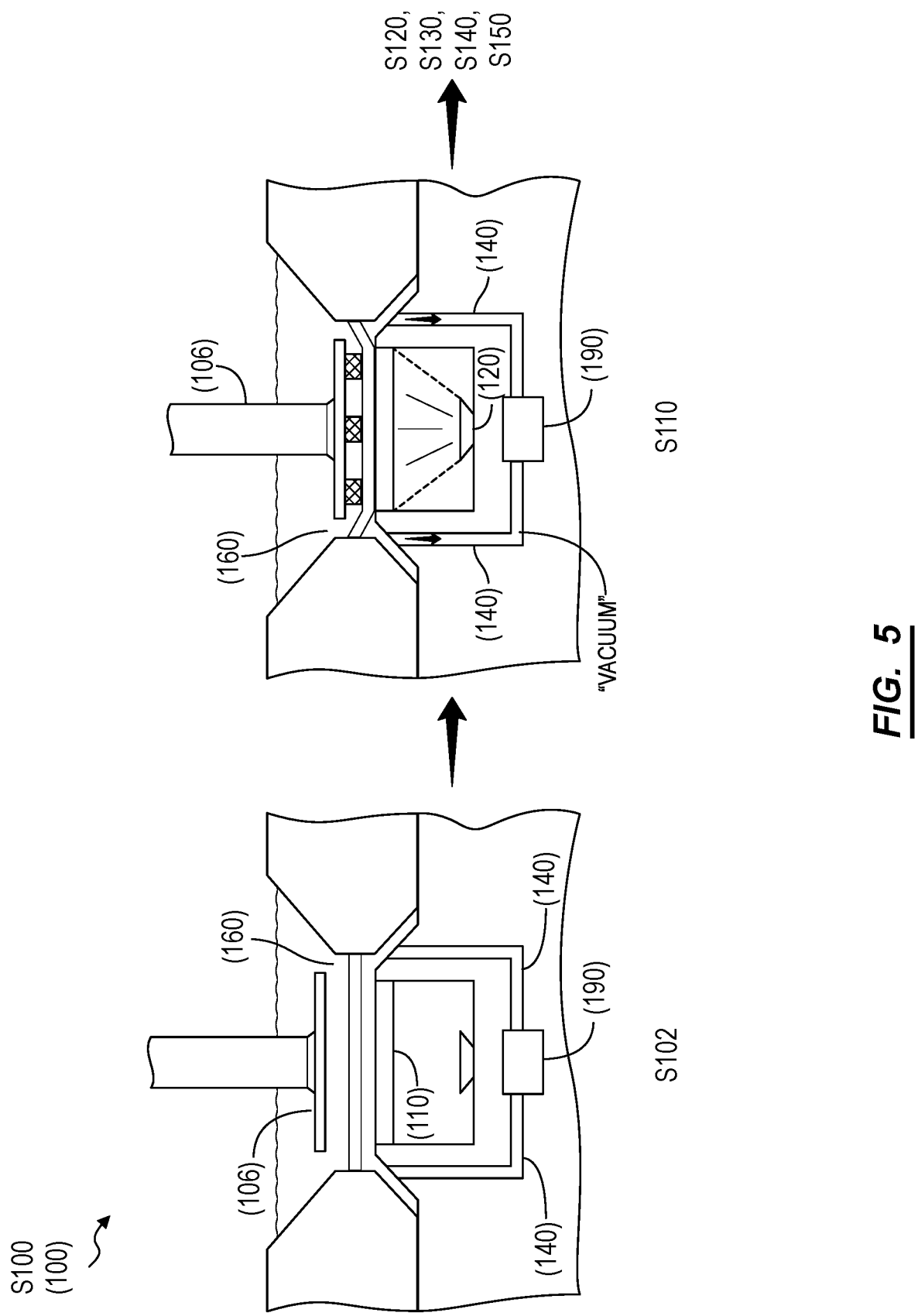
FIG. 5 is a flowchart representation of one variation of the additive manufacturing process.

As shown in FIG. 5, while selectively curing a current layer of resin in Block Silo, the system 100 minimizes the interstitial space between the build window 110 and the separation membrane 160 in order to repeatably maximize flatness and planarity of the outer surface of the separation membrane 160 in Block S102. In one implementation, prior to executing Block S110, the controller can trigger the pressure regulation system 190 to draw a vacuum on this interstitial region in order to flatten the separation membrane 160 across the build window 110. The pressure regulation system 190 can also continue to draw vacuum on the interstitial space between the build window 110 and the separation membrane 160—via the fluid distribution port 140—in order to maintain contact between the build window 110 and the separation membrane 160 during Block Silo. By drawing vacuum on this interstitial space prior to Block Silo, the system 100 can thus remove bubbles from between the build window 110 and the separation membrane 160 and ensure that the separation membrane 160 is laminated flush against the surface of the build window 110. Thus, the system 100 can: concurrently draw a vacuum in the interstitial region to maintain lamination of the separation membrane 160 to the build window 110 while photocuring the first volume of liquid resin in Block Silo; and concurrently draw a vacuum in the interstitial region to maintain lamination of the separation membrane 160 to the build window 110 while photocuring the second volume of liquid resin in Block S150.

Alternatively, the system 100 can achieve lamination via engagement between the tray assembly 104 and the base assembly 102. Thus, the system 100 can: photocure the first volume of resin to form the first layer of the build at the upper surface of the separation membrane 160 laminated over the build window 110 via engagement of a tray assembly 104 around the window platform 132, the separation membrane 160 tensioned over the build window 110 by the tray assembly 104 in Block Silo; and photocure the second volume of resin to form the second layer of the build at the upper surface of the separation membrane 160 laminated over the build window 110 via engagement of the tray assembly 104 around the window platform 132, the separation membrane 160 tensioned over the build window 110 by the tray assembly 104 in Block S150.

7.3 Initial Photocuring Phase

In Block Silo, the system 100 selectively photocures a first volume of resin to form a first layer of a build (e.g., corresponding to a first cross section of the build), wherein the build adheres to the build platform 106 opposite the separation membrane 160. Generally, once the build platform 106 has lowered into the resin at a height above the separation membrane 160 based on a target layer thickness of the first layer of the build 160, the controller instructs the projection system 120 to irradiate selective areas of the resin between the separation membrane 160 and the build platform 106 corresponding to a first layer of the build. The resin is configured to photocure upon exposure to the emissive spectrum of the projection system 120. More specifically, the system 100 can: photocure the first volume of resin to form the first layer of the build above the upper surface of the separation membrane 160 laminated over the build window 110, the first layer of the build adhering to a build platform 106; and retract the build platform 106 and the first layer of the build from the separation membrane 160. Thus, upon selective irradiation, the resin photocures, thereby strongly adhering to the build platform 106 and minimally adhering to the separation membrane 160. Additionally, the separation membrane 160 may adhere to the build window 110 proximal to photocured features of the first layer due to adhesion forces (e.g., suction forces, Stefan adhesion) between the separation membrane 160 and the build window 110.

However, the system 100 can selectively photocure a volume of resin between the build platform 106 and the separation membrane 160 utilizing any stereolithographic, DLP, or directed radiation technique.

7.4 Pressurization Phase

Following photocuring of the first layer of the build in Block Silo, the system 100 can execute Block S120, which includes triggering the pressure regulation system 190 to inject a fluid (e.g., air, oxygen, an inert gas) into the interstitial region between the build window 110 and the separation membrane 160 via the fluid distribution port 140. When the interstitial region is thus pressurized, the separation membrane 160 may begin to expand and to delaminate from the surface build window 110, such as from the perimeter of the build window 110 toward features of the current layer of the build that were cured in Block Silo (hereinafter "layer features"). The separation membrane 160 may thus exert a distributed circumferential "prying" force around the perimeter of each region of layer features in the newly cured layer of the build. For example, the pressure regulation system 190 can pressurize the interstitial region up to a pressure of 300 pascals, which may overcome adhesion forces (e.g., suction forces, Stefan adhesion) between the build window 110 and the separation membrane 160.

In one implementation, the pressure regulation system 190 injects an inert fluid into the interstitial region such that any fluid permeating the separation membrane 160 does not inhibit photocuring of the resin. Alternatively, the system 100 includes a separation membrane 160 constructed from TFE-AF or another oxygen-permeable material and the pressure regulation system 190 displaces oxygen (or oxygen-rich fluid) into the interstitial region such that an oxygenated layer forms across the outer surface of the separation membrane 160 when inflated in Block S120, thereby further preventing adhesion between the separation membrane 160 and layer features of the current layer of the build. In yet another alternative implementation, the system 100 can also include a separation membrane 160 that is substantially impermeable to oxygen (e.g., separation membrane 160 manufactured from crystalline PFA and characterized by a thickness greater than 50 microns). Thus, the system 100 can inject a fluid (e.g., such as air or an inert gas) into the interstitial region between the separation membrane 160 and the build window 110, where the separation membrane 160 is characterized by low gas permeability.

In another implementation, the system 100 does not actively inject fluid into the interstitial region while executing Block S120 and instead releases the vacuum being held during execution of Block S110 allowing the interstitial region to passively inflate.

Figure 6:
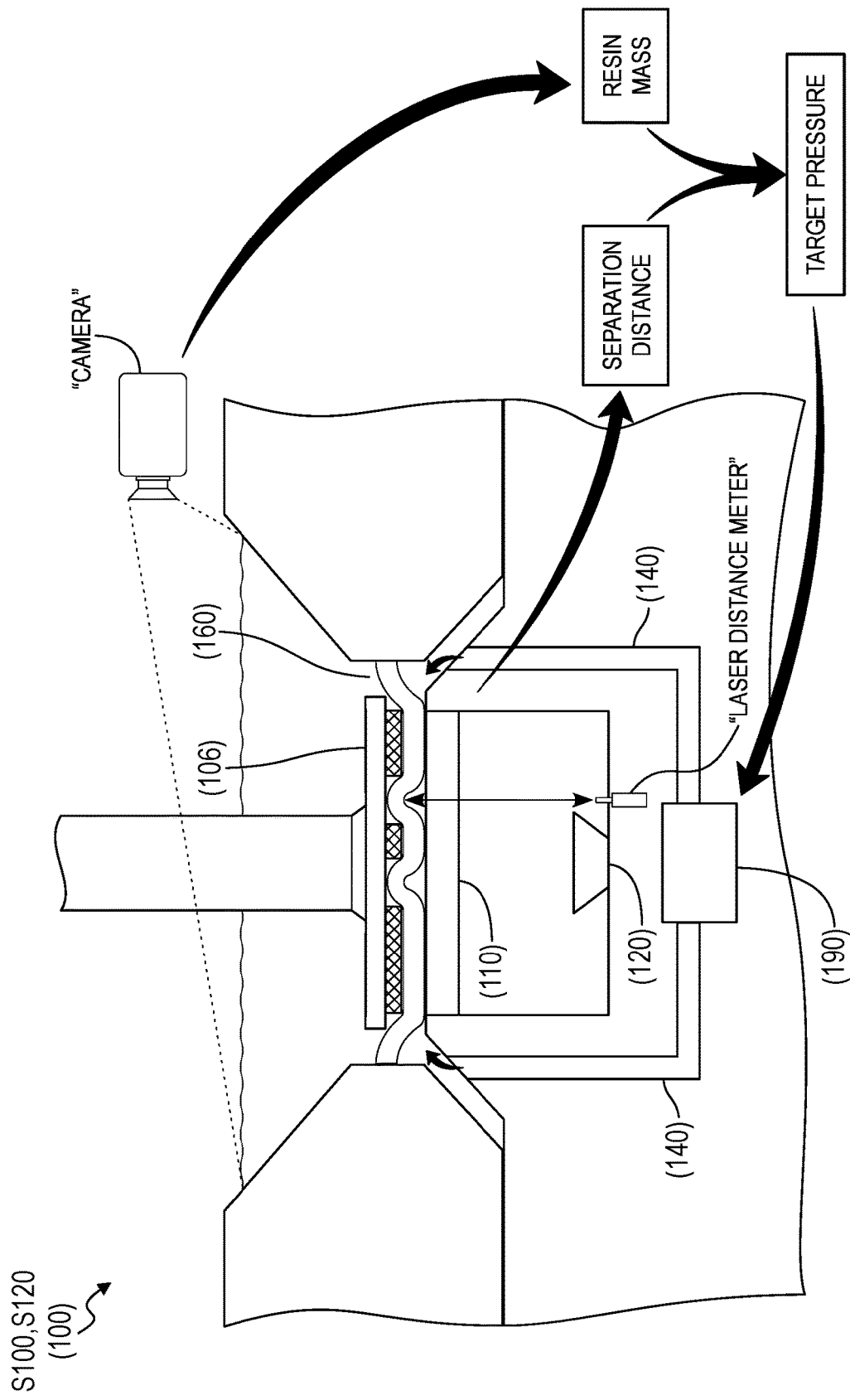
FIG. 6 is a flowchart representation of one variation of the additive manufacturing process.

As shown in FIG. 6, the system 100 can set a target interstitial pressure (e.g., a target absolute pressure or a target differential pressure relative to the build chamber) in the interstitial region in Block S120 and control the pressure regulation system 190 to reach this pressure within the interstitial region. In one implementation, the system 100 can set a target pressure corresponding to a target separation distance between the separation membrane 160 and the build window 110 resulting from the target interstitial pressure. In this implementation, an operator of the system 100 can empirically determine the target interstitial pressure that corresponds to a target separation distance. Alternatively, the system 100 can: evaluate a physical model of the separation membrane 160 and interstitial region to calculate a separation distance resulting from a range of interstitial pressures; and select a target interstitial pressure that results in the target separation distance.

Furthermore, because the separation distance resulting from interstitial pressure additionally depends on the weight of the resin in the resin reservoir and the ambient pressure within the build chamber, the system 100 can measure these variables prior to calculating the target interstitial pressure. For example, the system 100 can measure depth and volume of the resin by including a visible light camera positioned within the build chamber in order to record images of the resin reservoir. The system 100 can then execute computer vision techniques to calculate a volume of resin within the resin reservoir. Alternatively, system 100 can utilize a liquid level sensor to measure the depth and calculate the volume of the resin. Additionally, the system 100 can measure the temperature of the resin and access the density of the resin at the measured temperature in order to measure the total mass of the resin in the resin reservoir. The system 100 can then incorporate the mass of the resin in the reservoir as a variable in the physical model (or the empirical data) for the separation distance achieved by a range of interstitial pressures. Thus, the system 100 can: measure a mass of the resin over the separation membrane 160; calculate a target interstitial pressure based on a mass of resin in the reservoir, the target interstitial pressure corresponding to a target separation distance; and pressurize the interstitial region to the target interstitial pressure.

In another implementation, the system 100 can maintain the target interstitial pressure, during the pressurization phase, by executing a feedback control algorithm based on a current interstitial pressure. More specifically, the system 100 can: measure a series of interstitial pressures during the pressurization phase; and execute proportional-integral-derivative (hereinafter "PID") control to pressurize the interstitial region to the target interstitial pressure.

In yet another implementation, the system 100 can measure the separation distance of the separation membrane 160 from the build window 110 and execute a PID control algorithm to modulate the interstitial pressure, during the pressurization phase, in order to achieve a target separation distance. More specifically, the system 100 can: measure a separation distance of the separation membrane 160 from the build window 110 during pressurization of the interstitial region; and adjust the target interstitial pressure based on the separation distance (e.g., via a PID control algorithm). In this implementation, the system 100 can include a laser distance meter configured to measure the separation distance. Additionally, the system 100 can access a separation distance profile and control this separation distance in accordance with the profile over time via a feedback control loop and input from the laser distance meter.

However, the system 100 can pressurize the interstitial region to a target interstitial pressure in any other way.

7.4.1 Selective Inflation

In one implementation, the system 100 can determine whether to exclude Block S120 (e.g., based on the geometry of the build or the resin material) from selective build cycles. The system 100 can exclude inflating the interstitial region between the build window 110 and the separation membrane 160 when the system 100 photocures a build layer with geometry (e.g., low cross sectional area) and material properties (e.g., high target green strength or low viscosity), such that it does not cause significant adhesion forces (e.g., suction forces, Stefan adhesion) between the separation membrane 160 and the build window 110. In this implementation, the system 100 does not execute Block S120 and begins executing Block S130 after the completion of Block S110. Furthermore, in this implementation, the system 100 can also exclude the relamination phase of Block S140 (e.g., for the passive lamination variation of the system 100).

7.5 Retraction Phase

Generally, in Block S130, the build platform 106 retracts vertically upward away from the build window 110. More specifically, the controller instructs the linear actuation system coupled to the build platform 106 to exert an upward force in order to separate the build from the build window 110 and move the build upward. In one implementation, the system 100 applies, via the linear actuation system, force over time according to a material specific force profile consistent with the green strength and geometry of the build, as well as print conditions such as resin temperature and viscosity. When the sum of the upward force exerted by the build platform 106 and the prying force of the fluid inflating the interstitial space between the separation membrane 160 and the build window 110 is sufficient to overcome the adhesion forces (e.g., suction forces, Stefan adhesion) holding the separation membrane 160 proximal to the layer features of the build against the build window no, the separation membrane 160 may separate from the build window no and begin moving upward with the build platform 106. However, the separation membrane 160 may still adhere to the build as it rises upward.

The system 100 can detect the instant at which the separation membrane 160 separates from the build window no (e.g., by measuring a change in the force applied by the linear actuation system coupled to the build platform 106) and can continue to actuate the build platform 106 upward in order to separate the separation membrane 160 from the build. As the build platform 106 actuates away from the build window 110, the separation membrane 160 may continue to stretch while adhered to the rising build. However, the rising build platform 106 increases the force angle between the bottom surface of the build and the separation membrane 160, which may cause the separation membrane 160 to peel away from the build.

Figure 7:
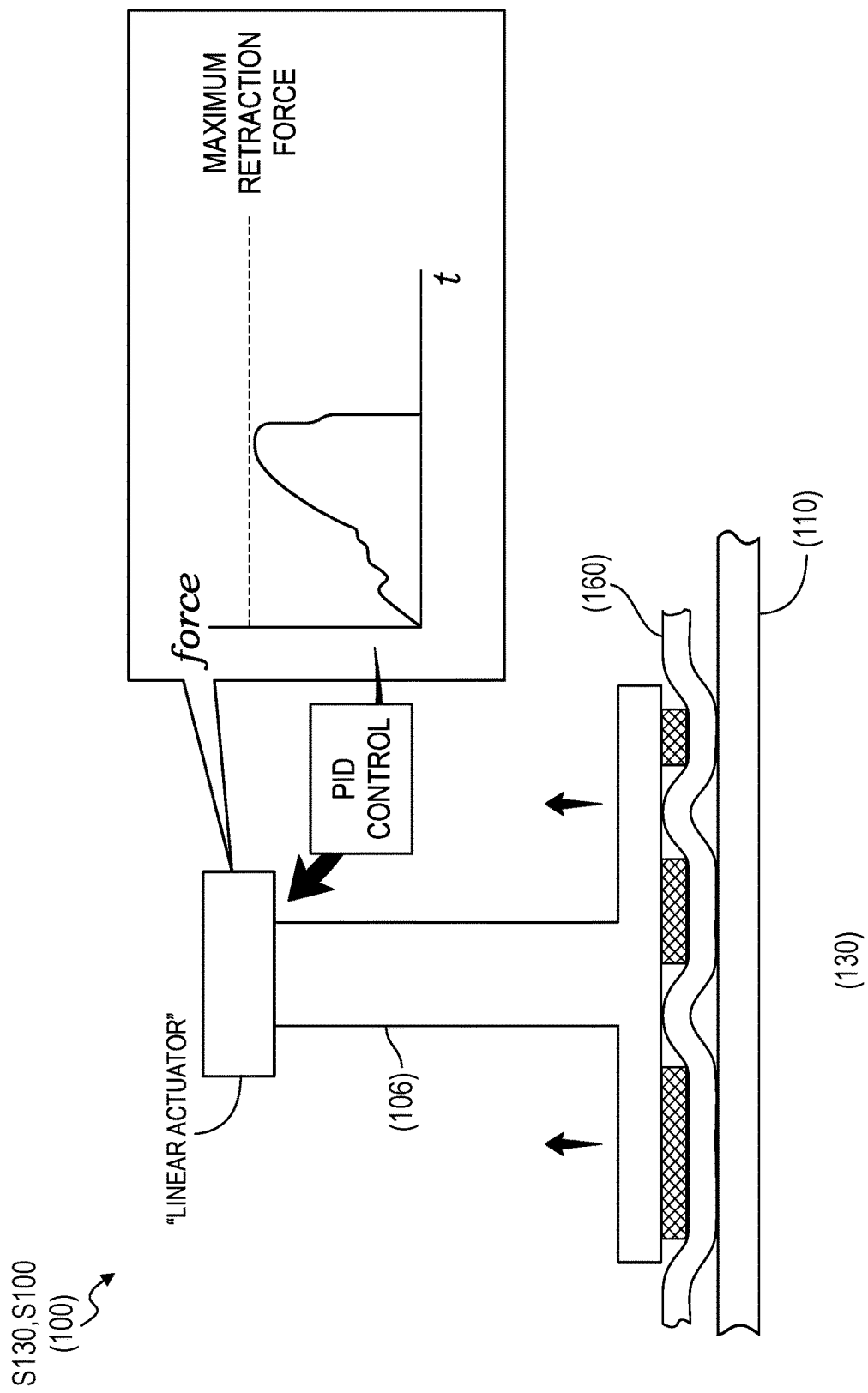
FIG. 7 is a flowchart representation of one variation of the additive manufacturing process.

In one implementation, as shown in FIG. 7, the system 100 can include a load cell within the build platform 106 to measure the cumulative force being applied to the build platform 106 and therefore the layer(s) of the build in its green state adhered to the build platform 106. Thus, the system 100 can measure the force exerted on the build platform 106 and/or the adhered build during the retraction phase via a load cell integrated with the build platform 106. Alternatively, the system 100 can estimate the force applied to the build platform 106 based on the torque of a motor configured to actuate the linear actuation system. In this implementation, the system 100 can execute closed-loop control algorithms—such as a PID control algorithm—to ensure that the peak force applied to the build platform 106 during the retraction phase does not exceed a maximum retraction force. The system 100 can calculate a maximum retraction force based on the green strength of the cured resin and/or the geometry of the build. For example, the system 100 can: access the geometry of the build (e.g., during the particular build cycle); estimate the distribution of force through this geometry over a range of applied forces (e.g., at the build platform 106) to identify a maximum stress and/or strain on the build; and estimate a maximum retraction force (as measured at the build platform 106) to prevent build failure based on the maximum stress and/or strain on the build and the green strength and/or geometry of the build. Thus, the system 100 can: access a maximum retraction force corresponding to the resin; measure a retraction force applied to the build platform 106 during retraction of the build platform 106; and adjust an acceleration and/or velocity of the build platform 106 based on the retraction force. The system 100 can also limit overshoot in the target force profile applied to the build over multiple build cycles during Block S130, thereby improving build quality and consistency.

Additionally, upon separation of the first layer of the build from the build window 110, the system 100 can actuate the build platform 106 according to a displacement curve, which defines the displacement (and therefore the velocity and acceleration) of the build platform 106 as it translates upward through the resin reservoir. The system 100 can define a displacement curve that ensures stability of the build while in its green state as it moves through the (often viscous) resin within the resin reservoir and/or during the first stages of separation of the separation membrane 160 from the build window 110. Therefore, the system 100 can adjust the velocity and/or acceleration defined by the displacement curve based on the viscosity of the resin. For example, the system 100 can define a displacement curve characterized by a relatively high peak velocity and a relatively high peak acceleration for a resin characterized by a relatively low viscosity. In another example, the system 100 can define a displacement curve characterized by a relatively low peak velocity and a relatively low peak acceleration for a resin characterized by a relatively high viscosity. Thus, the system 100 can: define a displacement curve for the build platform 106 based on a target green strength of the resin and a viscosity of the resin; and retract the build platform 106 according to the displacement curve.

7.6 Relamination Phase

Generally, in Block S140, the pressure regulation system 190 evacuates fluid from (e.g., depressurizes) the interstitial region, thereby pulling the separation membrane 160 taught across the surface of the build window 110. Additionally, by pulling the separation membrane 160 downward toward the build window 110, the system 100 can increase the rate of separation between the separation membrane 160 and the build and/or reduce the total retraction distance needed to peel the separation membrane 160 away from the build. Furthermore, by depressurizing the interstitial region between the separation region and the build window no, the system 100 ensures that the separation membrane 160 is laminated against the build window no such that there are no bubbles or wrinkles in the separation membrane 160 before the system 100 photocures a second layer in Block S150. More specifically, the system 100 can, via the pressure regulation system 190, reduce the differential pressure within the interstitial region relative to the build chamber in order to generate a downward force on the separation membrane 160 that causes the separation membrane 160 to separate from the newly cured layer of the build, if the separation membrane 160 has not already separated from the newly cured layer of the build due to retraction of the build platform 106 in Block S120. Furthermore, by reducing the differential pressure across the separation membrane 160, the system 100 can also increase the angle of separation of the separation membrane 160 from the build, thereby increasing the rate at which the separation membrane 160 may peel away from the newly cured layer of the build.

In one implementation, the system 100 can further decrease the differential pressure between the build chamber and the interstitial region by concurrently increasing the absolute pressure in the build chamber while decreasing the absolute pressure in the interstitial region. Thus, the system 100 can: pressurize a build chamber above the separation membrane 160 while evacuating the fluid from the interstitial region in order to further increase the force across the separation membrane 160 and improve separation of the separation membrane 160 from the newly cured layer of the build. By increasing the absolute pressure within the build chamber, the system 100 can also hasten the flow of resin underneath the retracted build platform 106 and adhered build in addition to increasing the force across the separation membrane 160.

7.7 Advancement Phase

Figure 8:
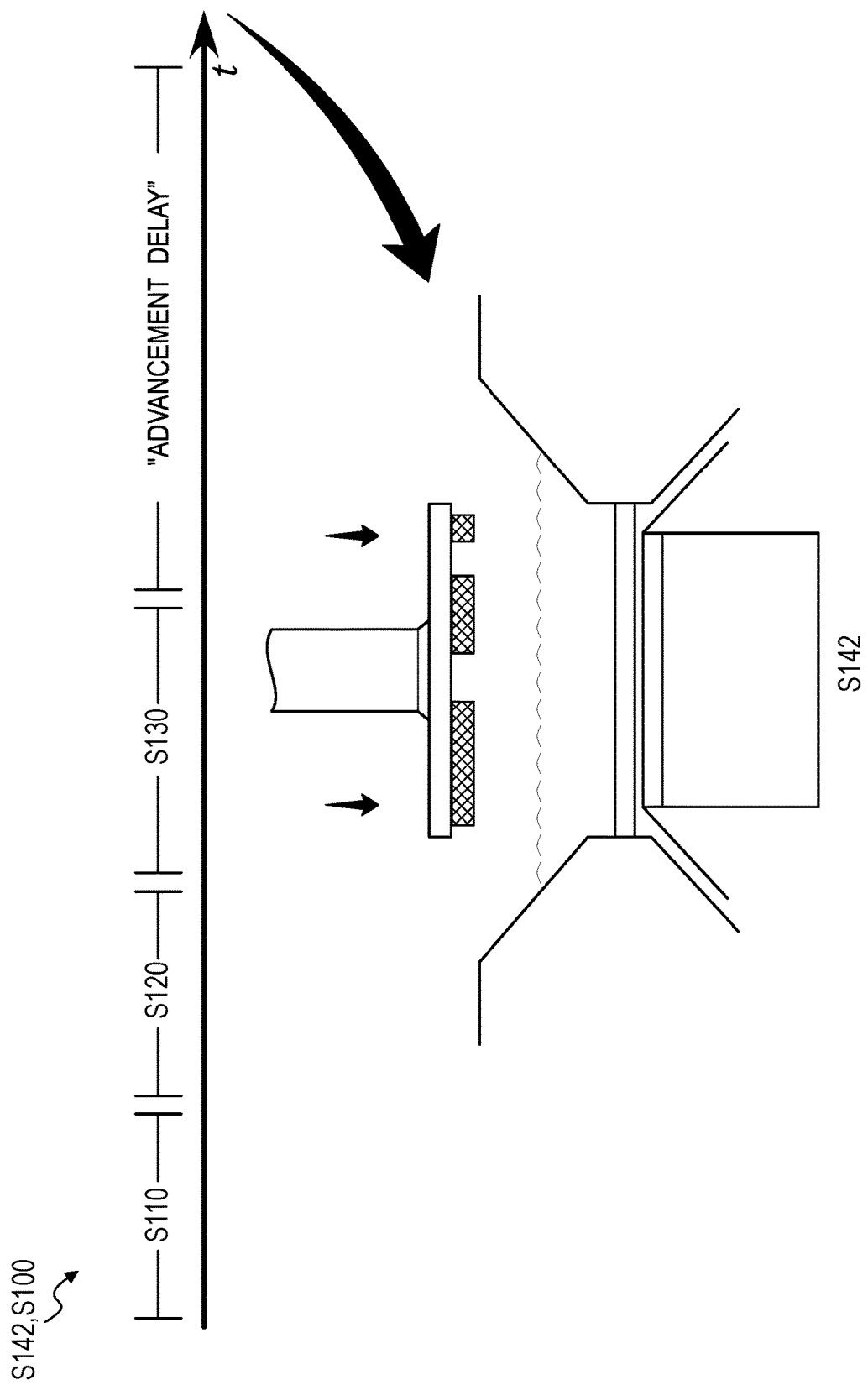
FIG. 8 is a flowchart representation of one variation of the additive manufacturing process.

In one implementation, as shown in FIG. 8, the system 100 executes an advancement phase by actuating the build platform 106 and adhered build via the linear actuation system to a distance relative to the separation membrane 160 such that the bottom surface of the build is a distance above the upper surface of the separation membrane 160 approximately equal to the target layer thickness of the subsequent layer of the build in Block S142, or at or above a distance above the separation membrane 160 in preparation for the subsequent photocuring phase of Block S150. The system 100 can execute an advancement phase in implementations where the system 100 retracts the build platform 106 farther than the layer thickness of the build in order to improve the angle of separation of the separation membrane 160 against the bottom surface of the build. Thus, by increasing the retraction distance, the system 100 can increase this separation angle and therefore more effectively peel the separation membrane 160 away from the newly cured layer of the build. However, before photocuring a subsequent layer, the system 100 can advance the build (downward and toward the build window 110) such that the newly cured layer is offset from the surface of the separation membrane 160 (that is laminated to the build window 110) by the preset layer thickness for the build—enabling the system 100 to photocure a subsequent layer between the current layer and the upper surface of the separation membrane 160. More specifically, the system 100 can: advance the build platform 106 toward the build window 110 to a target position above the separation membrane 160 laminated to the build window no, the target position based on a layer thickness parameter of the build; and photocure the second volume of resin to form the second layer of the build between the upper surface of the separation membrane 160 and the first layer of the build. In one implementation, further described below the system 100 can advance the build platform 106 to the same vertical position of the previous layer in order to cure a different selective volume of the same layer in the subsequent photocuring phase of Block S150. Additionally or alternatively, the system 100 can advance the build platform 160 to a vertical position enabling the system 100 to photocure a layer that overlaps with the previous layer in order to generate interlocking structures.

Additionally or alternatively, also shown in FIG. 8, the system 100 can execute an advancement delay between the relamination of the separation membrane 160 in the relamination phase and the advancement phase in order to allow the resin to settle in preparation for photocuring a subsequent layer. Furthermore, the system 100 can access (from an empirical data table) or calculate an advancement delay sufficient to allow the resin to flow back into position underneath the build and build platform 106. Thus, the system 100 can prevent translational flow in the resin reservoir caused by movement of the build platform 106 and the adhered build from affecting the features of the build during advancement of the build platform 106 in the resin reservoir prior to photocuring a subsequent layer of the build. More specifically, the system 100 can: access an advancement delay corresponding to the viscosity of the resin; and, during the advancement phase delayed from the relamination phase by the advancement delay, advance the build platform 106 toward the build window 110 to the target position above the separation membrane 160 laminated to the build window 110, the target position based on the layer thickness parameter of the build.

In another implementation, the system 100 can set an advancement speed and/or acceleration for the build platform 106 as it advances into or within the resin during the advancement phase. The system 100 can access (from an empirical data table) or calculate an advancement speed based on the distance of the build from the build window 110, the viscosity of the resin, the green strength of the resin, and/or the geometry of the build. For example, the system 100 can estimate the forces that may be imparted by the resin on the build upon insertion of the build into the resin reservoir over a range of advancement speeds. The system 100 can then select an advancement speed that the system 100 predicts will result in forces imparted to the build that are less than a threshold force. More specifically, the system 100 can: access a target advancement speed based on a viscosity of the resin and a geometry of the first layer of the build; and advance the build platform 106 toward the target position at the target advancement speed. Alternatively, the system 100 can: access an advancement profile specifying vertical positions of the build platform 106 over time; and actuate the linear actuation system according to this advancement profile during execution of Block S140 (e.g., according to feedback control algorithms), thereby enabling modulation of the advancement speed and/or acceleration over time.

7.7.1 Timing Variations

Generally, the system 100 executes Blocks S120, S130, and S140, in sequence as described above. However, as shown in FIGS. 9A, 9B, and 9C, the system 100 can execute Block S120 and S130 and/or Blocks S130 and S140 in an overlapping manner, thereby increasing build speeds. Additionally or alternatively, the system 100 can execute pauses between any Block of the additive manufacturing process S100 to improve print conditions during any Block. In one implementation, shown in FIG. 9A, the pressurization phase and the retraction phase can overlap, enabling faster separation between the build and the build window no. For example, the pressurization phase can begin and, as the system 100 approaches the target interstitial pressure, the system 100 can begin to retract the build platform 106 in the retraction phase. More specifically, the system 100 can, during the retraction phase concurrent with the pressurization phase, retract the build platform 106 from the build window no.

In another implementation, shown in FIG. 9B, the system 100 can begin the relamination phase while the system 100 is still retracting the build platform 106 such that the separation membrane 160 can peel away from the build at a higher rate and relaminate to the build window no more quickly. In one example, the system 100 can forgo an advancement delay by initiating the relamination phase while the build platform 106 is still retracting providing time for the resin to flow underneath the build platform 106 as the build platform 106 moves upward. More specifically, the system 100 can, during the relamination phase concurrent with the retraction phase, evacuate the fluid from the interstitial region to peel the separation membrane 160 from the first layer of the build and laminate the separation membrane 160 to the build window no.

In yet another implementation, shown in FIG. 9C, the system 100 can overlap the pressurization phase and the retraction phase and the retraction phase and the relamination phase, thereby further reducing the duration of the build cycle. Additionally or alternatively, the system 100 can modulate the interstitial pressure and the retraction speed in coordination with the overlapping phases. For example, the system 100 can detect separation of the newly cured layer from the build window 110 (e.g., based on force and/or acceleration detected at the build platform 106) and, in response to separation of the newly cured layer from the build window no, begin evacuating fluid from the interstitial region. In another example, the system 100 can increase a retraction speed of the build platform 106 while concurrently initiating the relamination phase in order to more effectively peel the separation membrane 160 from the newly cured layer of the build.

7.7.2 Successive Photocuring Phases

Upon execution of Blocks S120, S130, S140, and/or S142, the system 100 executes Block S150 to photocure a second layer of the build. Once the build platform 106 and adhered build are at a target offset from the surface of the separation membrane 160, the system 100 can selectively photocure a second volume of the resin between a surface of the layer features of the previously photocured layer and the upper surface of the separation membrane 160 corresponding to a second cross-section of the build in order to connect this second cross-section to the previous layer of the build (i.e. a second layer of the build). Upon photocuring the second layer of the build, the second layer may strongly adhere to the first layer of the build while minimally adhering to the separation membrane 160.

Once the system 100 photocures a second layer of the build, the system 100 can again execute Blocks S120, S130, and S140 to separate the bottom surface of the second layer from the upper surface of the separation membrane 160 and the build window 110. However, in implementations described below, the system 100 can execute variations of Blocks S120, S130, and S140 while separating the second layer of the build when compared to the separation of the first layer based on changes in the geometry of the build (e.g., via the addition of subsequent layers). For example, the system 100 can modify (e.g., reduce or increase) the maximum retraction force, during the retraction phase, based on the addition of new features in a subsequent layer. In another example, the system 100 can modify (e.g., reduce or increase) the target interstitial pressure based on features in a current layer of the build. In yet another example, the system 100 can modify the displacement curve during the retraction phase based on the addition of new features in subsequent layers. In an additional example, the system 100 can modify the advancement speed based on the geometry of subsequent layers.

8. Material Characteristics

Generally, the system 100 can access—from local storage or a remote database—material characteristics corresponding to the build material chosen for a particular build. More specifically, the system 100 can access material characteristics of both a resin phase (i.e. uncured build material) of the build material (hereinafter "the resin") and a photocured phase of the build material (hereinafter "photocured material") in its green state. By accessing these build material characteristics, the system 100 can adjust build parameters to maintain target conditions in the build chamber prior to and during the additive manufacturing process S100, thereby imparting target material properties to the build. Furthermore, by accessing a set of material characteristics, the system 100 can indirectly detect build failure upon sensing a significant deviation from these build material characteristics (either in the resin phase or the photocured phase).

The system 100 can access material characteristics of the build material including: a material type, a temperature-viscosity curve, a critical energy, a specific heat, a specific gravity, a thermal expansion and/or contraction coefficient, a curing depth, a UV penetration depth of the uncured build material, and/or additional cure characteristic of the resin such as (chemical reaction thermodynamics, polymerization shrinkage characteristics, residual/latent cure characteristics post-exposure to electromagnetic radiation, edge-curing characteristics (e.g., molecular building at perimeters of cross-sectional geometries), and/or through-curing characteristics (e.g., interlayer binding characteristics). Furthermore, the system 100 can access material characteristics of the photocured material such as a green strength-reaction temperature curve (relating the green strength of the photocured material to the temperature at which the photocuring reaction occurred), the elasticity of the photocured material, and/or any other characteristic of the photocured material.

In one implementation, the system 100 can execute the additive manufacturing process S100 with a number of different classes of photocuring polymers, which may vary in their typical mechanical and/or chemical characteristics. For example, the system 100 can manufacture builds consisting of thermosets, elastomers, interpenetrating network polymers, and/or any other type of photocuring polymer.

In one implementation, the system 100 can access a temperature-viscosity curve for a particular resin that is validated over the operating temperature range of the system 100 in order to maintain the resin at a target viscosity and/or adjust build parameters in response to real-time viscosity of the resin without directly measuring the viscosity of the resin and instead by measuring the temperature of the resin. For example, if the system 100 operates at a resin temperature between 20° C. and 100° C., then the system 100 can access a temperature-viscosity curve representing the relationship between temperature of the resin and viscosity of the resin within the same temperature interval. The system 100 can access temperature-viscosity curves based on empirical data or theoretical models. Alternatively, the system 100 can calculate a statistical best fit for empirical data based on any temperature-viscosity model such as the exponential model, the Arrhenius model, the Williams-Landel-Ferry model, and/or the Masuko-Magill model.

The system 100 can access photopolymerization parameters for the resin such as the depth of cure parameter, $D_P$, and the critical energy (per unit area of the resin), $E_c$, of the resin in order to adjust the UV light intensity of the projection system 120 and/or the exposure duration for each layer of the additive manufacturing process. $D_P$ is defined as:

$$P_z = P_0 e^{-\frac{z}{D_P}},$$

where $P_z$ is the incident power per unit area (e.g., light intensity) measured at a depth, z, within the resin phase of the resin, $P_0$ is the power per unit area measured at the surface of the resin. Thus, $D_P$ characterizes an exponential absorption rate of energy in the resin relative to the depth in the resin. $E_c$ is defined based on $D_P$ as follows:

$$C_d = D_P \ln\left[\frac{E_0}{E_c}\right],$$

where $C_d$ is the depth of cure and $E_0$ is the energy incident at the surface of the resin. Thus, the system 100 can access an empirically calculated $E_c$ according to the above equation.

Additionally, the system 100 can access a base energy, $E_b$, representing a magnitude of energy per unit area of the resin sufficient to adhere the first layer of a build to the build platform of the system 100.

In yet another implementation, the system 100 can access the specific heat and specific gravity (or density) of the resin in order to model thermodynamic and/or fluid-dynamic properties of the resin and adjust build parameters accordingly. The system 100 can access a single value for the specific gravity of the resin or an array of values corresponding to the different temperatures of the resin within the operating range of the system 100.

The system 100 can also access material characteristics that define an empirical relationship between conditions in the additive manufacturing process S100 and final material characteristics (and can optionally refine these relationships over time). In one implementation, the system 100 can access a green strength-reaction temperature curve in order to predict the green strength of the material based on the temperature of the resin, which is measurable in real-time during the additive manufacturing process S100. Thus, the system 100 can predict final properties of the build based on real-time data in the additive manufacturing process S100 and therefore detect and/or prevent build failure based on these real-time temperature data. Generally, green strength of a photocured material is related to reaction temperature due to an increase in crosslinking density that occurs at higher temperatures. The system 100 can access an empirically or theoretically determined green strength-reaction temperature curve expressed as an array of data points, interpolated data points, or as a continuous function defined as an equation.

In another implementation, the system 100 can access material characteristics that define an empirical relationship between exposure intensity and green state characteristics and between energy dose and green state characteristics.

Additionally, the system 100 can access values for specific mechanical properties of the photocured material such as the elasticity of the photocured material, rigidity of the photocured material, or any other characteristic of the photocured material. The system 100 can access these characteristics as single values or as a function of conditions in the additive manufacturing process S100.

9. Build Parameters

Generally, during execution of the additive manufacturing process S100, the system 100 operate according to a set of build parameters that define operation of the electromechanical components of the system 100 via the controller. These build parameters are described in further detail below.

9.1 Photocuring Phase Parameters

Generally, the system 100 can execute the photocuring phase of the additive manufacturing process S100 according to a set of photocuring phase parameters, such as exposure intensity, exposure duration, exposure delay, target reaction temperature, target bulk resin temperature, and/or advancement delay. More specifically, the system 100 can photocure a volume of liquid resin according to Block Silo of the additive manufacturing process once the system 100 has achieved the target reaction temperature at the resin interface (i.e., the upper surface of the separation membrane) and the target bulk resin temperature for the volume of resin within the tray assembly 104. Additionally, upon advancing the previous layer of the build to a target vertical offset from the upper surface of the separation membrane, the system 100 can wait for an exposure delay (to enable the resin to settle) prior to exposing the resin to electromagnetic radiation. The system 100 can then expose a selective volume of resin to electromagnetic radiation at the exposure intensity and for the exposure duration before waiting for the advancement delay prior to disturbing the newly cured layer of the build. Thus, by modifying these photocuring phase parameters, the system 100 can finely control characteristics of the build derived from the photocuring phase of the additive manufacturing process S100.

9.2 Pressurization Phase Parameters

Generally, the system 100 can execute pressurization phase of the additive manufacturing process S100 according to a set of pressurization phase parameters, such as target maximum differential pressure and a target pressurization duration. More specifically, the system 100 can, after the advancement delay between the end of the photocuring phase and the beginning of the pressurization phase, inject fluid into the interstitial region between the separation membrane 160 and the build window 110 up to the target maximum differential pressure and for the target pressurization duration. Thus, by modifying these pressurization phase parameters, the system 100 can ensure that retracting build platform can overcome suction forces between the build window and the separation membrane and overcome adhesion forces between the separation membrane and the recently photocured layer of the build without exerting excessive force onto the build itself.

In one implementation, the system 100 can store a target inflation curve for the pressurization phase indicating the target pressure relative to time within the pressurization phase. Thus, the system 100 can fully define the intended inflation for the pressurization phase via the shape of the pressurization profile.

9.3 Retraction Phase Parameters

Generally, the system 100 can execute the retraction phase of the additive manufacturing process S100 according to a set of retraction phase parameters, such as initial retraction speed and retraction distance. More specifically, the system 100 can, after a advancement delay between the photocuring phase and the retraction phase, retract the build platform 106 away from the build window no at the initial retraction speed and to the retraction distance from the upper surface of the build window 110. Thus, by modifying the retraction phase parameters, the system 100 can reduce forces applied to the build upon separation of the separation membrane 160 from the build window no and upon separation of the separation membrane 160 from the most recently photocured layer (i.e., current layer) of the build.

In one implementation, the system 100 stores all retraction distances as an offset between the bottom surface of the current layer of the build and the build window no. Thus, as the system 100 photocures additional layers of the build, the system 100 can automatically increase the retraction distance of the build platform 106 to account for the increased depth of the build as a result of these additional layers.

In another implementation, the system 100 can represent the retraction distance and initial retraction speed via a retraction curve representing the offset of the build platform 106 from the build window no relative to time within the retraction phase. Thus, the system 100 can fully define the retraction of the build platform via the curve instead of via individual parameters.

In yet another implementation, the system 100 can store a maximum retraction force as a retraction phase parameter. In this implementation, the system 100 can, during retraction of the build platform 106 from the build window 110 and via feedback control algorithms, limit the force applied to the build platform (and therefore the adhered build) to less than the specified maximum retraction force. Thus, the system 100 can prevent physical destruction of the newly-photocured build upon separation of the separation membrane 160 from the build window no and separation of the separation membrane 160 from the current layer of the build.

9.4 Relamination Phase Parameters

Generally, the system 100 can execute the relamination phase of the additive manufacturing process S100 according to a set of relamination phase parameters, such as a relamination delay following the pressurization phase and a maximum vacuum strength. More specifically, the system 100 can relaminate the separation membrane 160 to the build window no after waiting for a relamination delay upon completing the pressurization phase of the additive manufacturing process S100 and can pull a vacuum within the interstitial region between the separation membrane 160 and the build window no specified by the maximum vacuum strength. Thus, the system 100 can more quickly relaminate the separation membrane 160 to the build window no in preparation for a subsequent photocuring phase.

Similar to the pressurization phase parameters, the system 100 can represent the timing and strength of the vacuum pulled by the pressurization system 190 via a deflation curve that fully specifies the timing, magnitude, and rate of depressurization effected by the pressurization system 190 during the relamination phase. In one implementation, the system 100 can store a single pressurization curve representing the pressurization of the interstitial region during the pressurization phase and the depressurization of the interstitial region during the relamination phase.

9.5 Advancement Phase Parameters

Generally, the system 100 can execute the advancement phase of the additive manufacturing process S100 according to a set of advancement phase parameters, such as the out-of-resin advancement speed and the in-resin advancement speed. More specifically, the system 100 can advance the build platform 106 and the build adhered to the build platform 106 toward the build window no at the out-of-resin advancement speed prior to current layer of the build coming into contact with the volume of resin within the tray assembly 104 and at the in-resin advancement speed upon the build entering the resin volume.

Similar to the retraction phase parameters, the system 100 can represent the advancement phase parameters as an advancement displacement curve specifying the displacement of the build platform 160 relative to the build window no over time during the advancement phase. In one implementation, the system 100 can store a single displacement curve representing the displacement of the build platform 106 during both the retraction phase and the advancement phase, thereby fully defining the timing of both phases relative to each other.

10. Target Build Characteristics

Generally, the system 100 can receive a set of target build characteristics from a user interface in order to select a set of build parameters based on the geometry of the build and the build material for additive manufacturing process S100. More specifically, the system 100 can receive a target dimensional accuracy, a target build speed, and/or a set of target mechanical properties within a range of possible mechanical properties for the build material. Thus, the system 100 can adjust and/or prioritize build parameters based on the received target build characteristics on a per-build or per-layer basis.

In one example, the system 100 can decrease an electromagnetic exposure intensity from the projection system 120 in response to receiving a higher requested target dimensional accuracy. In another example, the system 100 can increase the bulk resin temperature in response to receiving a high target green strength within a range of target green strengths for the build material. In yet another example, the system 100 can increase retraction and/or advancement speed in response to receiving a faster target build speed.

Upon calculating a set of initial build parameters based on a set of target build characteristics, can then adjust the initial build parameters between successive layers of the build by executing Blocks of the first method S200.

11. Sensor Data Streams

Generally, the system 100 can sample sensors in the sensor suite to capture and/or record a set of sensor data streams representing the conditions within the system 100 during build cycles of the additive manufacturing process S100 in order to modify build parameters to maintain target mechanical and/or dimensional properties for the build in view of changing conditions within the build chamber according to Blocks of the first method S200 and in order to detect build failure according to Blocks of the method S300. More specifically, the system 100 can capture temperature profile including a bulk resin temperature (via a temperature sensor) and an interface temperature distribution (via thermographic camera), a force profile (via a load cell in the build platform) representing the force applied to the build platform over time, an audio profile (via the set of microphones) representing audio data over time, an inflation profile representing the pressure within the interstitial region between the separation membrane 160 and the build window no over time, visible light images (via the set of image sensors), an oxygen concentration in the build chamber, a humidity in the build chamber, an ambient pressure in the build chamber, a differential pressure in the build chamber, and/or a resin level in the build tray in Blocks S220 and S310.

The system 100 can timestamp and store the aforementioned sensor data streams (as part of a build record) locally or at a remote server connected to the system 100 over a network in order to associate these data streams with concurrent build parameters and build geometry as is further described below.

11.1 Force Profile

As shown in FIG. 17, the system 100 can include a force sensor (e.g., a load cell) configured to detect forces applied to the build platform during the additive manufacturing process S100 and can capture a set of sensor data streams including a force profile captured via the force sensor. More specifically, with regard to the first method S200, the system 100 can: capture a force profile during a build cycle; extract characteristics of the force profile representing each stage of the retraction phase in the additive manufacturing process; compare the identified characteristics of the force profile to a set of target characteristics; and adjust the build parameters of the system 100 to achieve a set of target build characteristics. With regard to the second method S300, the system 100 can: capture a force profile during a build cycle; compare this force profile to prior force profiles of prior layers of the build or to a target force profile; and calculate a likelihood of failure based on this comparison.

In one implementation, the system 100 can extract an initial separation stage duration, a vector peeling stage duration, an initial separation peak force, and a vector peeling peak force from the force profile and compare these characteristics to target characteristics of a force profile given the geometry of the current layer of the build cycle.

11.2 Temperature Profile

Generally, the system 100 can include a set of temperature sensors configured to detect a temperature distribution at the resin interface at the upper surface of the separation membrane 160 (or in some implementations at the upper surface of the build window no) and to detect a bulk resin temperature of resin within the tray assembly 104 during execution of the additive manufacturing process S100. More specifically, with regard to the first method S200, the system 100 can: capture the bulk resin temperature; calculate a viscosity of the resin based on a temperature-viscosity curve for the resin; and adjust build parameters based on the current viscosity of the resin. Alternatively, the system 100 can: capture a temperature distribution at the resin interface; compare this temperature to a target (or expected) temperature at the resin interface; and calculate the proportion of the target photocuring reaction that occurred during the build cycle.

With respect to the second method S300, the system can, via a comparison between measured and expected temperature distributions, detect failure of polymerization for a build layer based on a lack of an increase in temperature at the resin interface as a result of target polymerization during the photocuring phase of the additive manufacturing process S100.

11.3 Audio Profile

As shown in FIG. 18, the system 100 can include a set of microphones configured to capture audio data representing sound generated during the retraction phase of the additive manufacturing process S100. More specifically, the system can: capture an audio profile during a build cycle of the additive manufacturing process; compare this current audio profile to previous audio profile; and calculate a likelihood of build failure based on this comparison and the change in layer geometry corresponding to each build layer. Thus, the system 100 can detect audible differences in the retraction phase of successive layers of the build while accounting for differences in the geometry of these layers to calculate a likelihood of failure for a current layer of the build.

In one implementation, the system 100 can extract a set of audio profile characteristics such as a maximum separation amplitude, a duration of vector separation, and a number of audible features (i.e. discrete sounds that generally correspond to discrete elements of the layer of the build) and compare these characteristics across audio profiles to accurately assess the differences between successively recorded audio profiles.

11.4 Inflation Profile

Figure 19:
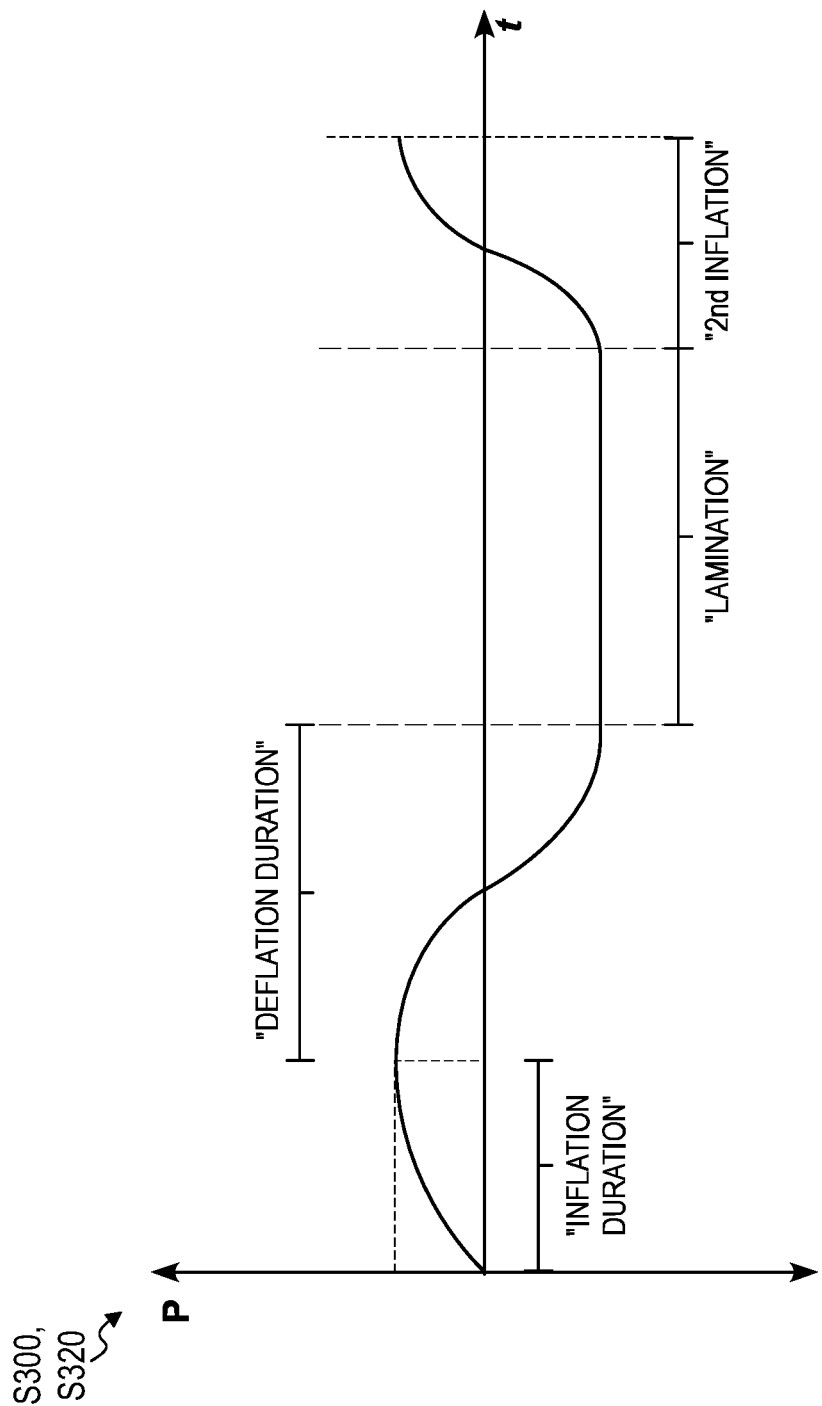
FIG. 19 is a flowchart representation of one variation of the second method.

As shown in FIG. 19, in implementations of the system 100 including an inflatable separation membrane 160, as described above, the system 100 can include a set of pressure sensors configured to capture the pressure within the interstitial region between the separation membrane 160 and the build window no during the pressurization and relamination phases of the additive manufacturing process S100. More specifically, with respect to the method S300, the system 100 can detect sealing failures between the base assembly 102 and the tray assembly 104 by capturing the pressures achieved within interstitial region during the pressurization phase.

11.5 Visible Light or Multispectral Imaging

In one implementation, the system 100 can include a set of visible light or multispectral image sensors configured to capture images of the build during build cycles of the additive manufacturing process S100. More specifically, the system can include visible light or multispectral image sensors in multiple locations such as adjacent to the projection system 120 below the build window no (defining a field of view encompassing the bottom surface of the current layer of the build) and/or within the build chamber defining a field of view encompassing one or more sides of the build. In particular, with regard to the method S300, the system 100 can: estimate the real geometry of the build; compare this with geometry accessed from the three-dimensional file representing the build; and calculate a likelihood of failure based on this comparison.

11.6 Build Record

Generally, the system 100 can compile the above-described sensor data streams into a build record of the data collected during the additive manufacturing process S100 and can label this build record with the target geometry of the build at each point in the record. More specifically, the system 100 can record a time series of data for each of the aforementioned data sources, such that each data entry is stored in association with the build geometry at that time. In particular, the system 100 can record build geometry based on an STL file (or any other three-dimensional representation of the build) for the build as a two-dimensional representation of the layer being manufactured at a particular time and/or as three-dimensional representation(s) of the current build geometry for each layer of the build, potentially spanning multiple layers, ranges of layers, or subsections thereof in the region surrounding the layer.

Thus, the system 100 can input the build record into the interlayer feedback model and/or the failure prevention model (further described below) in order to calculate a set of build parameters for a subsequent layer of the build (or within the current layer) or to identify a build failure respectively.

In one implementation, the system 100 stores the build record as a series of vectors, wherein each vector includes a values from each sensor data stream, a timestamp, and a representation of the planned two-dimensional geometry of the layer being manufactured during the timestamp and/or a representation of the planned three-dimensional geometry of the build during the timestamp. However, the system 100 can represent the build record in any other way that stores real-time sensor data with concurrent geometry being manufactured by the system 100.

12. Parameter Adjustment

Generally, the system 100 can adjust a set of build parameters in response to real-time data (i.e., the set of sensor data streams) collected by the system 100 based on the interlayer feedback model and/or the failure prevention model. More specifically, the system 100 can adjust build parameters such as exposure duration, light intensity, exposure delay, advancement delay, separation speed, separation distance, chamber temperature, bulk resin temperature, interface temperature, inflation pressure, inflation speed, and/or advancement speed in order to increase the speed and quality of the build and reduce the likelihood of build failure.

The system 100 can control an exposure duration of the resin by electromagnetic radiation from the projection system during the photocuring stage of the additive manufacturing process. The exposure duration defines a duration of time that the projection system 120 projects electromagnetic radiation (UV or near-UV light) incident to selective volumes of the resin to form a successive layer of the build.

The system 100 can also control a light intensity profile of the UV light from the projection system 120 during the photocuring stage of the additive manufacturing process. In one implementation, the system 100 can control the intensity of UV light incident to the resin on a pixel-by-pixel basis in order to improve build quality and/or fine tune material properties of the build.

Additionally, the system 100 can control an exposure delay between a time at which the system 100 advances the build platform by a single layer thickness in preparation for selectively photocuring a successive layer of the build and a time at which the projection system 120 directs light incident to the resin. By executing a delay between positioning the build for photocuring of the next layer and subsequently photocuring a new layer of the build, the system 100 ensures that finer features of the build have mechanically recovered from being repositioned by the advancement of the build platform. However, the system 100 can adjust this build parameter based on the rigidity of the material to improve manufacturing time and or build quality as further described below.

The system 100 can also control an advancement delay when the system 100 completes selective photocuring of a layer of the build and when the system 100 begins to advance the build platform in order to photocure the successive layer. The system 100 can control this advancement delay in order to allow for increased polymerization of elastic polymers before mechanically disturbing the build, thereby improving quality of elastomer builds by allowing for energy return and rebound of an elastic build. However, in one implementation, the system 100 can minimize or forgo an advancement delay for thermoset or more rigid build materials.

Furthermore, the system 100 can control the separation speed and/or separation force of the build (adhered to the build platform) from the build window in order to prevent excessive force from deforming the newly photocured layer upon separation from the build window.

In implementations of the system 100 including a separation membrane, the system 100 can also control the maximum separation distance of the build from the build window in order to fully separate the build from the separation membrane. Thus, the system 100 can ensure that the build completely separates from the separation membrane regardless of the elasticity of the build material for the build.

The system 100 can also control the advancement speed of the build platform as it advances the build into the resin reservoir in order to reduce the forces experienced by the build as it comes into contact with the viscous resin while also improving manufacturing time. In one implementation, the system 100 can specify a resin surface advancement speed and a build window advancement speed so that the system 100 can advance the build platform in separate stages thereby enabling the system 100 to increase the speed of the build platform upon approach to the resin surface while decreasing the speed of the build form upon approach to the build window such that viscous fluid proximal to the build window can flow out from underneath the descending build and build platform.

However, the system 100 can control any other aspect of the aforementioned manufacturing process.

13. Interlayer Feedback Model

Generally, the system 100 can adjust build parameters for the additive manufacturing process S100 by inputting the set of sensor data streams captured during the one or more most recent build cycles into an interlayer feedback model (executing locally on the system 100 or at a remote computer server) in order to adjust build parameters for subsequent layers of the additive manufacturing process, thereby improving build quality (relative to the target build characteristics), dimensional accuracy of the build, and manufacturing time of the build. In particular, the system can calculate second set of build parameters based on the set of sensor data streams, the second layer geometry, and an interlayer feedback model in Block S230.

More specifically, the system 100 can execute a set of sub-models that each control a particular set of build parameters described above. In particular, the system 100 can execute an interlayer feedback model including: projection feedback model; a pressurization feedback model; a retraction feedback model; and an advancement feedback model. In some variations of the system 100 including an inflatable separation membrane, the system 100 can execute additional sub-models such as an inflation pressure sub-model.

Upon generating an output set of build parameters for a subsequent build cycle, the system 100 can, during a second build cycle, manufacture a second layer of the build according to the second set of build parameters, the second layer of the build adhering to the first layer of the build in Block S240.

In one implementation, the system 100 can store the output set of build parameters in association with each layer of the build for which the system 100 generated these build parameters. The system 100 can then transmit each output set of build parameters in association with each layer of the build to other instances of the system 100 also executing the same build. Thus, these additional instances of the system 100 can execute build cycles with a refined set of build parameters based on conditions recorded during prior iterations of the build.

13.1 Projection Feedback Model

Figure 11:
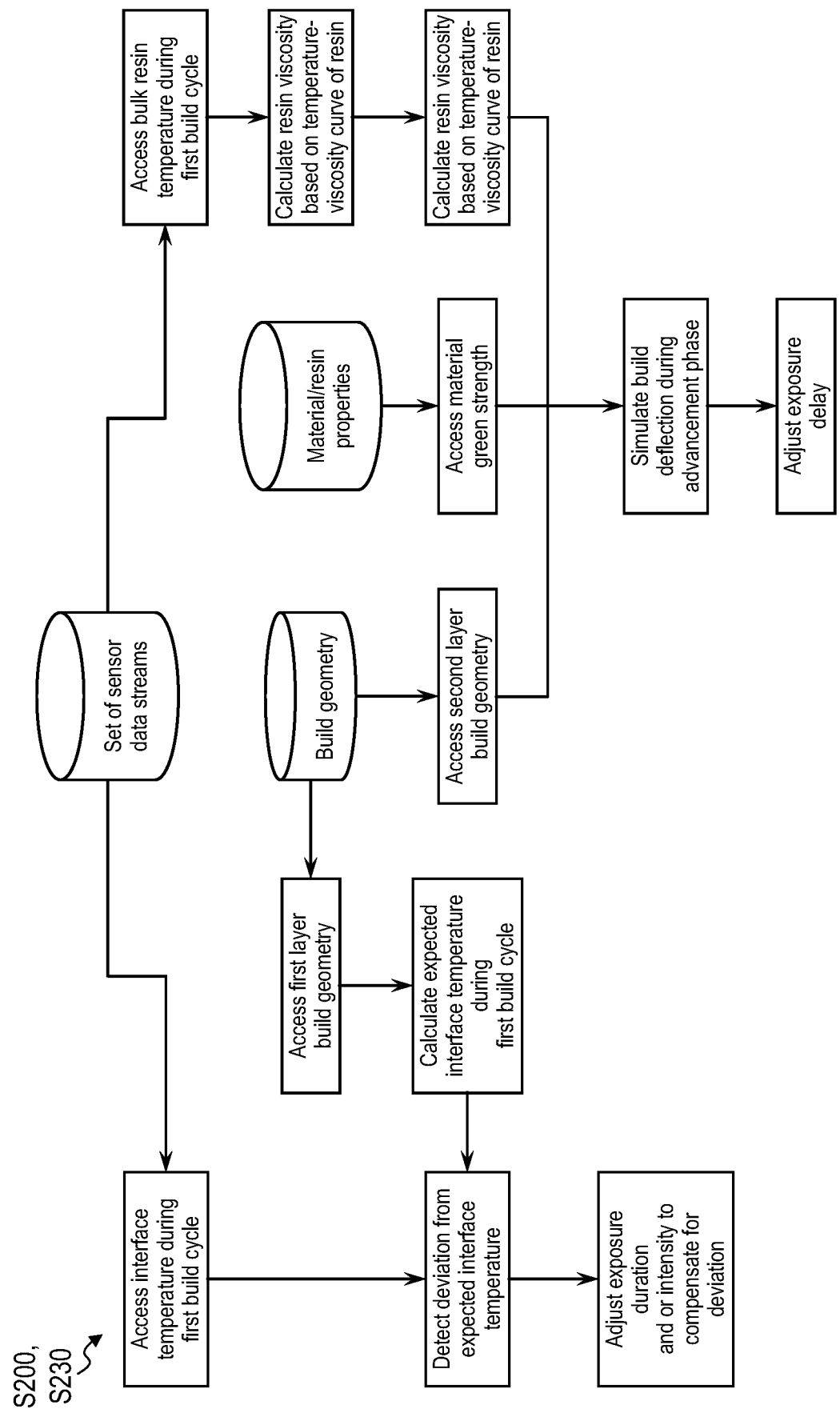
FIG. 11 is a flowchart representation of one variation of the first method.

Generally, as shown in FIG. 11, the system can execute a projection feedback model to control the set of photocuring phase parameters including exposure intensity, exposure duration, exposure delay, target reaction temperature, target bulk resin temperature and/or advancement delay. More specifically, the system 100 can execute the projection feedback model as a heuristic-based model, as a set of closed-loop control functions operating continuously during each successive build cycle, or as a machine learning model defining an input vector representing the set of sensor data streams and an output vector representing values of the set of photocuring parameters for the subsequent build cycle.

In one implementation, the system 100 can adjust the exposure delay and/or the advancement delay of a subsequent layer via the photocuring feedback model, in response to a detected bulk resin temperature. More specifically, the system 100 can calculate an exposure delay time based on the green rigidity of the build material and the current viscosity of the resin by: accessing the bulk resin temperature from the set of sensor data streams of the prior build cycle; estimating the viscosity of the resin within the build tray; executing a physical model to simulate the amount of deflection of the build material in response to viscous forces sustained by the build during the advancement phase of the subsequent build cycle and the amount of time needed to ensure the rebounds from this deflection within the exposure delay.

In another implementation, the system can adjust the exposure duration and/or the exposure intensity via the photocuring feedback mode, in response to detected deviation from an expected interface temperature at resin interface. More specifically, the system 100 can: calculate an expected interface temperature after the photocuring phase of a build cycle; access the interface temperature distribution at the resin interface from the set of sensor data streams; and detect a deviation from the expected interface temperature. In response to a lower than expected temperature at the resin interface, the system 100 can increase the exposure duration and/or the exposure intensity to increase the amount of photocuring occurring at the resin interface. In response to a higher than expected temperature at the resin interface, the system 100 can decrease the exposure duration and/or the exposure intensity to decrease the amount of photocuring occurring at the resin interface.

13.2 Pressurization Feedback Model

Figure 12:
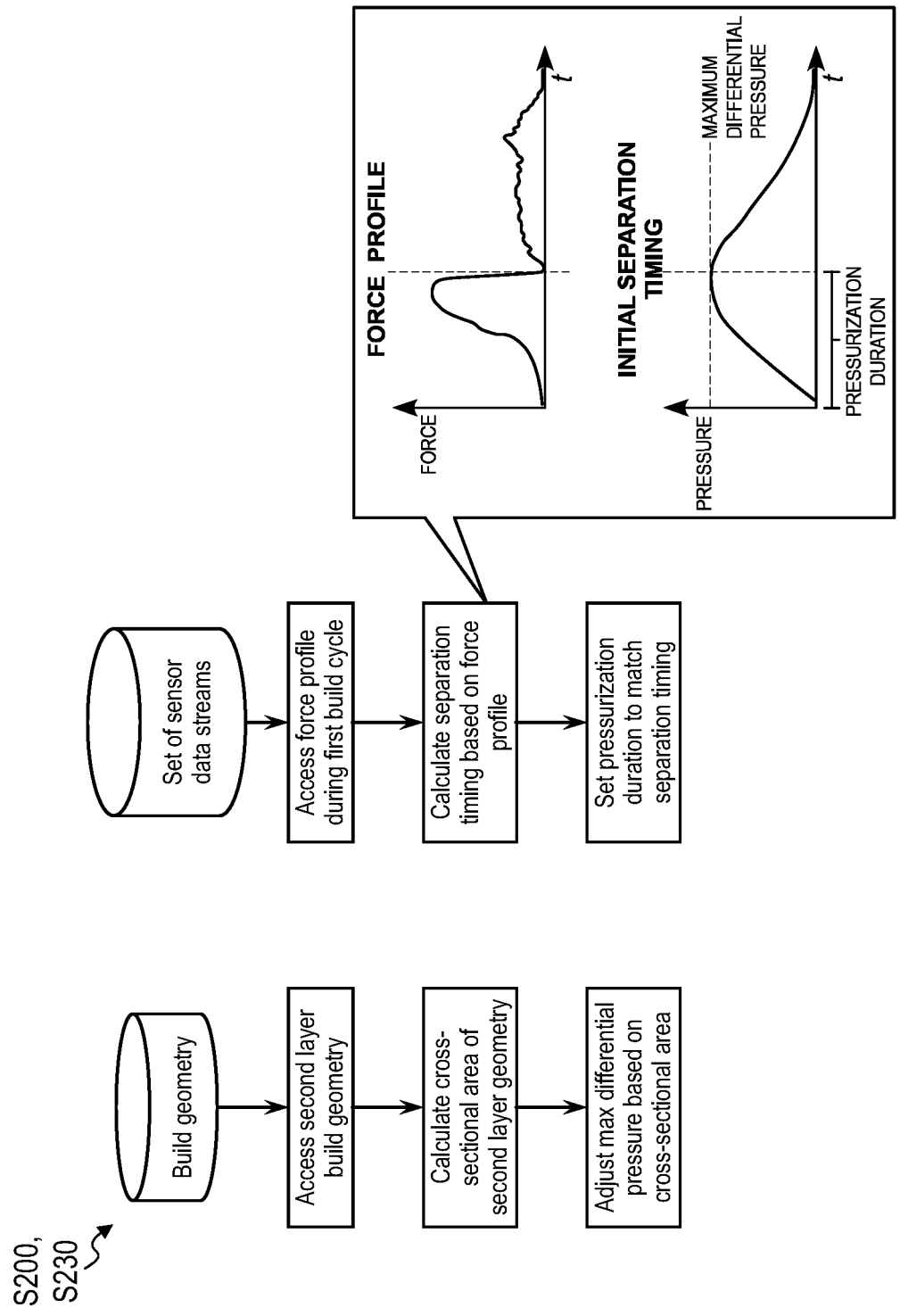
FIG. 12 is a flowchart representation of one variation of the first method.

In one variation, shown in FIG. 12, the system 100 can execute a pressurization feedback model to control the set of pressurization phase parameters including target maximum differential pressure and a target pressurization duration. More specifically, the system 100 can execute the pressurization feedback model as a heuristic-based model, as a set of closed-loop control functions operating continuously during each successive build cycle, or as a machine learning model defining an input vector representing the set of sensor data streams and an output vector representing values of the set of pressurization phase parameters for the subsequent build cycle.

In one implementation, the system 100 can adjust the maximum differential pressure, via the pressurization feedback model, in response to the build geometry of the subsequent layer of the build. More specifically, the system can: access a build geometry of a subsequent layer of the build; calculate the cross-sectional area of the layer of the build; and set the maximum differential pressure based on the cross-section area of the build. Thus, the system can increase the maximum differential pressure proportional to an increase in the cross-sectional area of the subsequent layer of the build or reduce the maximum differential pressure proportional to a decrease in the cross-section area of the subsequent layer of the build.

In another implementation, the system 100 can adjust the target pressurization duration, via the pressurization feedback model, in response to a force profile captured during the previous layer of the build. More specifically, the system 100 can: access a force profile from the set of sensor data streams; calculate a separation timing (e.g., relative to an initial retraction); and align the pressurization duration with the separation timing. Thus, the system 100 can reduce the build time of the build by reducing excess pressurization time in the build cycle.

13.3 Retraction Feedback Model

Figure 13:
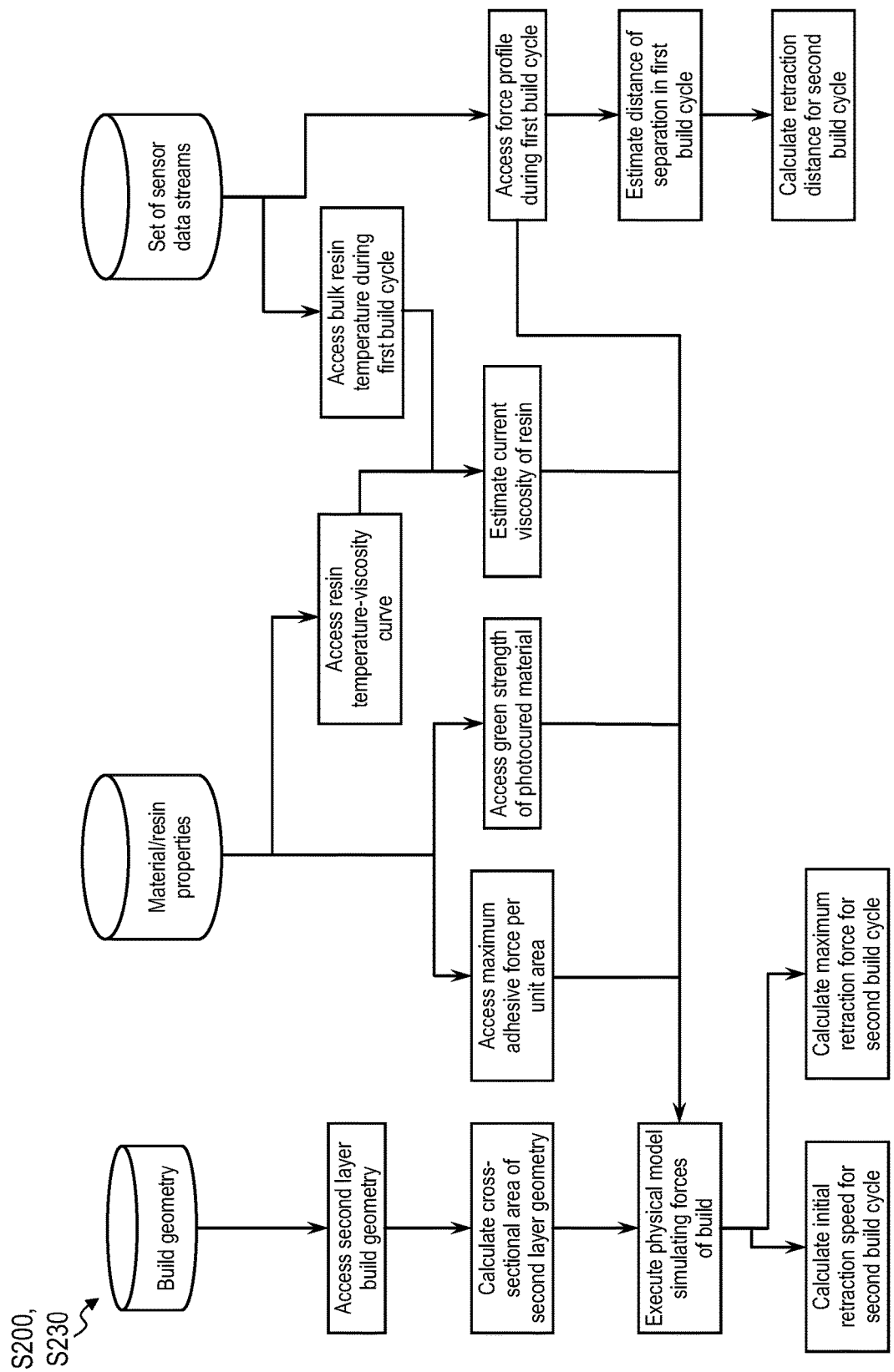
FIG. 13 is a flowchart representation of one variation of the first method.

Generally, as shown in FIG. 13, the system 100, executes a retraction feedback model to control the set of retraction phase parameters including retraction delay, initial retraction speed, and retraction distance. More specifically, the system 100 can execute the retraction feedback model as a heuristic-based model, as a set of closed-loop control functions operating continuously during each successive build cycle, or as a machine learning model defining an input vector representing the set of sensor data streams and an output vector representing values of the set of retraction phase parameters for the subsequent build cycle.

In one implementation, the system 100 can calculate an initial separation speed, via the retraction feedback model, based on an adhesive force (per unit area), a green strength of the photocured build material, the type of the build material, and/or the build geometry (including any support material). The system 100 can execute a physical model to determine a maximum initial speed or force with which to actuate the build platform and the adhered build. The system 100 can estimate the cross-sectional area of the build that is adhered to the build window (or separation membrane) by accessing the geometry of the most recent layer of the build and multiplying the cross-sectional area by a maximum adhesive force per unit area in order to estimate forces applied to the build during the separation phase of the build cycle. The system 100 can also estimate the propagation of this force through previous (already photocured) layers of the build by accessing prior layer geometries in order to predict the force experienced in different locations across the build. The system 100 can then leverage the green strength of the photocured material to determine whether the build will break given a particular separation speed. The system 100 can therefore calculate a separation speed that is predicted to avoid failure of the build within a predetermined safety factor.

In one implementation, the system 100 executes a finite element model to predict forces that are applied to the build during separation of the build from the build window over a range of speeds. The system 100 can evaluate the finite element model with the current geometry of the build and the current conditions within the build chamber in order to calculate a speed at which the predicted forces sustained by the build during separation of the build from the build window are less than a yield strength of the build material and an associated safety margin.

In another implementation, the system 100 can execute feedback techniques by measuring the force experienced at the build platform with a z-axis load cell installed in the build platform. The system 100 can then correlate the z-axis force measured at the build platform to local, geometry specific, stress and strain on the build based on the three-dimensional geometry of the build and according to the finite element model. The system 100 can then control the separation force to maintain the local forces experienced by the build less than a safety margin around the maximum force sustainable by the build.

The system 100 can also execute the retraction feedback model to control the retraction speed of the build platform as it actuates away from the build window (after separation of the build from the build window). The system 100 can predict a retraction speed for a build cycle based on the current estimated viscosity of the resin (e.g., by measuring the bulk temperature of the resin and evaluating the temperature-viscosity curve of the resin at the measured temperature), the green strength of the photocured build material, and the geometry of the build during the build cycle. Similar to the separation speed sub-model, the system 100 can execute a physical model (e.g., a finite element model) to determine the forces experienced by the build as the build platform retracts through the resin reservoir. Thus, the system 100 can calculate fluid-resistive forces imparted on the build by the viscous resin according to a fluid dynamic model and the estimated current viscosity of the resin. The system 100 can also execute feedback techniques, via the z-axis load cell as described above, to prevent the build from sustaining greater than a calculated maximum retraction force sustainable by the build during the retraction operation of the build cycle.

In yet another implementation, the system 100 can calculate a retraction distance for the subsequent build cycle based on the force profile captured during the previous build cycle. More specifically, the system 100 can: access the force profile captured during the previous build cycle; calculate a separation distance at which the separation membrane separated from the previous layer of the build; and set the subsequent retraction distance at a predetermined margin in excess of the separation distance. Thus, the system 100 can retract the build platform only marginally farther subsequent to separation of the separation membrane from the build.

In yet another implementation, the system can calculate a retraction distance for a subsequent build cycle based on images recorded of the build during the retraction phase of a previous or current build cycle. More specifically, the system 100 can: access a set of images of the build as the system 100 retracts the build in a previous or current build cycle; identify a location of the build platform at which the build has fully separated from the separation membrane; calculate the retraction distance of the build platform from the build window corresponding to this position; and set this retraction distance as the retraction distance for the current or subsequent layer. Thus, the system 100 can account for builds including high-elongation elastomers for which the force profile may be less reliable in calculating the minimum retraction distance.

13.4 Advancement Feedback Model

Figure 14:
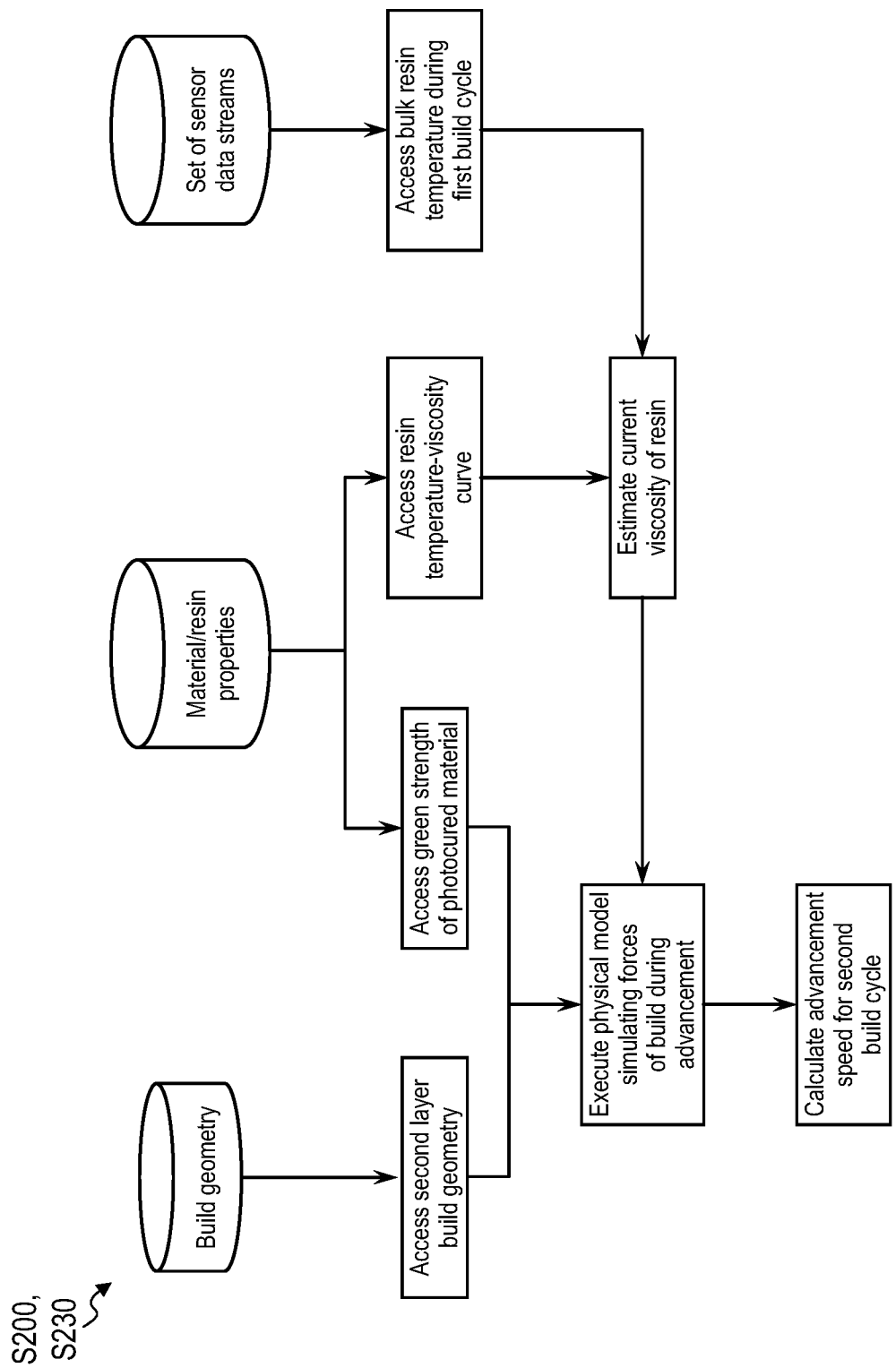
FIG. 14 is a flowchart representation of one variation of the first method.

Generally, as shown in FIG. 14, the system 100, execute a retraction feedback model to control the set of retraction phase parameters including retraction delay, initial retraction speed, and retraction distance. More specifically, the system 100 can execute the retraction feedback model as a heuristic-based model, as a set of closed-loop control functions operating continuously during each successive build cycle, or as a machine learning model defining an input vector representing the set of sensor data streams and an output vector representing values of the set of retraction phase parameters for the subsequent build cycle.

In one implementation, the system 100 can, via the advancement feedback model, calculate an advancement speed at which the build platform descends to a predetermined height (equal to the layer thickness) above the build window before the system 100 photocures a subsequent layer of the build. As a result of this advancement of the build platform, the build platform and the build adhered to the build platform displace resin between the build and the build window thereby imparting a force on the build. The system 100 can execute the calculating an advancement speed based on the current estimated viscosity of the resin (calculated based on the bulk resin temperature, the temperature-viscosity curve for the resin, and/or the force profile measured during retraction or advancement of the build during prior build cycles), the green strength (or other green-state characteristics) of the build material, the build geometry (e.g., the cross-sectional area of the most recent layer of the build or a three-dimensional representation of the current build) and the depth of the resin reservoir. Additionally, the system 100 can simulate the mechanics (e.g., fluid and solid mechanics) of the build (based on the build geometry) as the system 100 advances the build into the resin reservoir, thereby accounting for displacement of delicate or minimally-supported features of the build. Furthermore, the system 100 can implement feedback controls to: measure the force at the build platform during advancement of the build platform and actuate the build platform to limit the force below a maximum advancement force.

In one implementation, the system 100 can: detect the level of the resin reservoir; advance the build platform at maximum speed until the build is positioned immediately above the resin reservoir; and slow the build platform to the calculated advancement speed before advancing the build into the resin reservoir. Thus, the system 100 can reduce build time while imparting the same force to the build when entering the resin reservoir.

In yet another implementation, the system 100 can further slow the build platform as the build platform approaches the build window in order to prevent displacement or disturbance of the layer of resin immediately above the build window (i.e. at the resin interface). Additionally, by reducing the speed of the build platform as the build approaches the build window, the system 100 can reduce deflection of finer features in the build.

In yet another implementation, the system 100 can dynamically calculate the advancement timing for advancing the build into the resin reservoir by recording images of the build via a visual light image sensor and identifying a time at which the build has ceased rebounding from stresses incurred on the build during the retraction phase. Thus, the system 100 can ensure that the build has experience proper energy return (e.g., for an elastic material) prior to advancing the build.

14. Failure Detection

Generally, in Block S320 the system 100 can detect failure of a build based on the set of sensor data streams captured by the system 100 during execution of the additive manufacturing process S100. More specifically, the system 100 can execute a heuristic-based failure detection model or a machine learning model to output a cumulative likelihood of build failure at any given timestamp during the additive manufacturing process S100. The system 100 can detect multiple types of build failures such as a photocuring failure (e.g., the photocuring reaction does not occur), a dimensional failure (e.g., the system 100 does not maintain the specified dimensional accuracy), a mechanical failure (e.g., mechanical deformation of the build), or target characteristics failure (e.g., physical properties of the photocured resin are out of specification). Thus, the system 100 can assess the likelihood that the build has failed and, in response to this likelihood exceeding a threshold likelihood executing an action to mitigate the consequences of the likely build failure.

Similar to the interlayer feedback model of the first method S200, the system 100 can execute multiple sub-models assessing the likelihood of failure during each phase of the additive manufacturing process S100. For example, the system 100 can execute a photocuring failure detection model, a pressurization failure detection model, a retraction failure detection model, and/or an advancement failure detection model. Alternatively, the system 100 can train a single machine learning model (e.g., such as an artificial neural network) that receives an input vector representing the set of sensor data streams and generates an output indicating a likelihood of failure between zero and one.

In one implementation, the system 100 can include a previously calculated likelihood of failure as an input to the failure detection model in a subsequent build cycle. More specifically, the system 100 can, in response to the first likelihood of failure exceeding the first threshold likelihood: in a second build cycle of the additive manufacturing process: manufacture a second layer of the build adhering to the first layer of the build and record a second set of sensor data streams; and calculate, via a failure detection model, a second likelihood of failure of the build based on the second set of sensor data streams and the first likelihood of failure. Thus, the system 100 can cumulatively asses the likelihood of build failure based on data captured in multiple build cycles. Alternatively, the system 100 can calculate a likelihood of failure for each timestamp of a build record and continuously update this likelihood during progression of the additive manufacturing process S100.

14.1.1 Photocuring Failure Model

More specifically, the system 100 can: access a geometry of a layer; predict a target temperature distribution that will be produced by the photocuring reaction (e.g., by modelling the effects of an exotherm of the photocuring reaction on the current temperature distribution); capture a thermographic image of the resin interface after photocuring a next layer of the build; calculate a measured temperature distribution based on the thermographic image; and detect a deviation between the measured temperature distribution and the predicted temperature distribution. If the system 100 detects lower than target temperatures at the build window (e.g., the deviation between the predicted and measured temperature distribution is greater than a threshold deviation), then the system 100 can indicate that photocuring has not occurred and that the build has failed.

Alternatively, the system 100 can execute a convolutional neural network (hereinafter "CNN") with inputs including a temperature distribution (in the form of a thermographic image of the resin interface at the upper surface of the build window) and the geometry of the most recent layer of the build. The system 100, by executing this CNN, can output a likelihood of a failure for the photocuring phase of the build.

Thus, the system 100 can: calculate a target temperature of resin at the upper surface of the build window based on a geometry of the first layer of the build; and calculate, via the failure detection model, the first likelihood of failure of the build based on the target temperature and the first set of sensor data streams comprising the first temperature.

In another implementation, the system 100 can access a cross-sectional visual light image recorded via a visual light image sensor positioned below the build window 110. The system can compare these images with the corresponding target cross-sectional geometry of the build layer in order to detect excess or insufficient polymerization of the layer of the build during the photocuring phase of the additive manufacturing process S100.

14.1.2 Pressurization Failure Model

Generally, in a variation of the system 100 including the separation membrane 160, the system 100 can detect failure of the pressurization subsystem 190 or failure of the seal of the interstitial region between the separation membrane 160 and the build window 110. More specifically, the system 100 can: access an inflation profile from the set of sensor data streams; access a target inflation profile (or a target maximum differential pressure and inflation duration); compare the captured inflation profile to the target inflation profile; and, in response to detecting greater than a threshold deviation between the captured inflation profile and the target inflation profile. Thus, the system can detect when the pressurization subsystem 190 is no longer functioning and can pause the print to prevent material waste and/or further damage to the system 100 (e.g., via resin ingress into the interstitial region.

14.1.3 Retraction Failure Model

Generally, the system 100 can detect mechanical failure of the build during the retraction phase of the additive manufacturing process S100. More specifically, the system 100 can: access a target force profile representing target retraction of the build platform from the build window in a most recent build cycle of the additive manufacturing process; and calculate, via the failure detection model, the first likelihood of failure of the build based on the target force profile and the set of sensor data streams comprising the force profile. Thus, the system 100 can detect whether build failure has occurred based on the characteristics of the force profile relative to a target or expected force profile. However, the system can also utilize other sensor data streams in the set of sensor data streams to detect build failure during the retraction phase of the additive manufacturing process S100.

In one implementation, the system 100 can access force profiles from consecutive build cycles and compare these profiles to calculate a likelihood of build failure during the retraction phase. Generally, the system 100 operates under the assumptions that, excepting large variations in layer geometries, force profiles of adjacent layers are largely similar to one another. Thus, a significant deviation between force profiles of adjacent layers can be indicative of a failure.

For example, the system 100 can identify characteristics—such as the initial separation stage duration, a vector peeling stage duration, an initial separation peak force, and a vector peeling peak force from the force profile (as shown in FIG. 17)—and compare these characteristics for force profiles of consecutive build cycles. The system 100 can detect deviations between characteristics of consecutive force profiles based on threshold values for each characteristic. Alternatively, the system 100 can execute a machine learning model trained to recognize failure during the retraction phase based on force profiles captured during consecutive build cycles.

In one implementation, the system 100 can also account for changes in the geometry of the build between consecutive layers when analyzing the force profiles captured during consecutive build cycles. For example, the system 100 can: detect a number of discrete regions for each of two consecutive layers based on the cross-sectional geometry of these layers; and in response to detecting a difference in the number of discrete regions between these layers, the system 100 can modify the thresholds and/or sensitivity of the retraction failure model. Additionally or alternatively, the system 100 can detect changes in the geometry of the build between consecutive layers via other metrics such as the cross-sectional area of each layer, the perimeter of each layer or any other characteristic that can be extracted from the geometry of each layer.

Thus, the system 100 can: access a geometry of the first layer of the build; access a geometry of the second layer of the build; and, in a second build cycle of the additive manufacturing process, manufacture a second layer of the build and capture a second set of sensor data streams via the sensor suite, the second set of sensor data streams comprising a second force profile recorded via the load cell. The system 100 can then, calculate, via the failure detection model, a likelihood of failure of the build based on: the first set of sensor data comprising the first force profile; the second set of sensor data streams comprising the second force profile; the geometry of the first layer of the build; and the geometry of the second layer of the build.

Alternatively, the system 100 can simulate a target (or expected) force profile based on the geometry of the current layer and a physical model and compare a force profile captured during the build cycle of this layer to the target force profile. For example, the system 100 can calculate a target maximum retraction force and a target vector separation duration and calculate deviations between these target characteristics and measured characteristics of the force profile captured during the current build cycle.

In one implementation, the system 100 can access audio profiles from consecutive build cycles and compare these profiles to calculate a likelihood of build failure during the retraction phase. Generally, the system 100 operates under the assumption that, excepting large variations in layer geometries, audio profiles of adjacent layers are largely similar to one another. Thus, a significant deviation between audio profiles of adjacent layers can be indicative of a failure.

For example, the system 100 can identify characteristics—such as the initial separation stage duration, a vector peeling stage duration, a maximum separation amplitude, a duration of vector separation, and a number of audible features (as shown in FIG. 18)—and compare these characteristics for audio profiles of consecutive build cycles. The system 100 can detect deviations between characteristics of consecutive audio profiles based on threshold values for each characteristic. Alternatively, the system 100 can execute a machine learning model trained to recognize failure during the retraction phase based on audio profiles captured during consecutive build cycles associated with a failure.

In one implementation, the system 100 can also account for changes in the geometry of the build between consecutive layers when analyzing the audio profiles captured during consecutive build cycles. For example, the system 100 can: detect a number of discrete regions for each of two consecutive layers based on the cross-sectional geometry of these layers; and in response to detecting a difference in the number of discrete regions between these layers, the system 100 can modify the thresholds and/or sensitivity of the retraction failure model. Additionally or alternatively, the system 100 can detect changes in the geometry of the build between consecutive layers via other metrics such as the cross-sectional area of each layer, the perimeter of each layer or any other characteristic that can be extracted from the geometry of each layer.

Thus, the system 100 can: access a geometry of the first layer of the build; access a geometry of the second layer of the build; and, in a second build cycle of the additive manufacturing process, manufacture a second layer of the build; and record a second set of sensor data streams via the sensor suite, the second set of sensor data streams comprising a second audio profile recorded via the microphone. The system can then calculate, via the failure detection model, a second likelihood of failure of the build based on: the first set of sensor data comprising the first audio profile; the second set of sensor data streams comprising the second audio profile; the geometry of the first layer of the build; and the geometry of the second layer of the build.

Alternatively, the system 100 can simulate a target (or expected) audio profile based on the geometry of the current layer and a physical model and compare an audio profile captured during the build cycle of this layer to the target audio profile. For example, the system 100 can calculate a target maximum audio amplitude and a target number of discrete audio features and calculate deviations between these target characteristics and measured characteristics of the audio profile captured during the current build cycle Thus, the system can: access a target audio profile representing target retraction of the build platform from the build window; and calculate, via the failure detection model, the first likelihood of failure of the build based on the target audio profile and the first set of sensor data streams comprising the first audio profile.

14.2 Failure Response

Generally, upon calculating a likelihood of failure for the most recent build cycle in Block S320, the system 100 can compare the likelihood to a set of likelihood ranges or thresholds corresponding to various subsequent actions of the system 100. More specifically, the system 100 can, in response to various likelihood values output by the failure detection model, label the build record for the build to indicate the likelihood of failure associated with a build cycle; pause the additive manufacturing process S100; capture confirmation images of the build in order to verify build failure; and/or notify an operator of the system 100 that a build failure is likely to have occurred. Thus, the system can prevent material waste and unnecessary machine time utilization in the case of build failures, thereby improving efficiency and reliability of the system 100.

14.2.1 Build Record Labelling

Generally, upon calculating a likelihood of build failure for a current build cycle, the system 100 can, in response to the likelihood of failure exceeding a first (lower-valued) threshold likelihood, flag the build to indicate the likelihood of failure in Block S330. Alternatively, the system 100 can, in response to calculating the first likelihood of failure within a first likelihood range, flag the build to indicate the first likelihood of failure. More specifically, upon detecting a likelihood of failure greater than a threshold likelihood (e.g., 50%), the system 100 can indicate in the build record, either in association with the relevant sensor data streams captured during the build cycle at issue or within the build record more broadly, that a problem or anomaly was detected during the additive manufacturing process S100. Thus, upon completion of the build, an operator of the system 100 can review the build record and identify the particular build cycle and the corresponding anomalous sensor data streams that resulted in the elevated likelihood of failure. By flagging the build in this manner, the system 100 facilitates diagnostic investigation of builds for which detectable build failure does not occur but for which target build characteristics are not met.

In one implementation, the system 100 can flag a build by generating a visual or textual notification on a user-interface of the system 100 in a build record viewing window. For example, the system 100 can, in response to a user input, render a build record of the build (e.g., in the form of a timeline or another suitable graphic); and render a tag or indication in the graphic specifying the time at which the anomaly occurred.

In another implementation, the system 100 can, in response to detecting an anomalous likelihood of failure, store sensor data streams captured during the associated build cycle to a repository specific to anomalous data. An operator of the system 100 may then open this repository to view or analyze this anomalous data and identify the specific builds during which these anomalies occurred.

In yet another implementation, the system 100 can include an interface enabling an operator to: view the build record of a build in process; select a build cycle or timestamp in the build record; label anomalies in the build record; and/or manually adjust build parameters in real-time to reduce the probability of failure in future build cycles.

14.2.2 Record Confirmation Image

Figure 16:
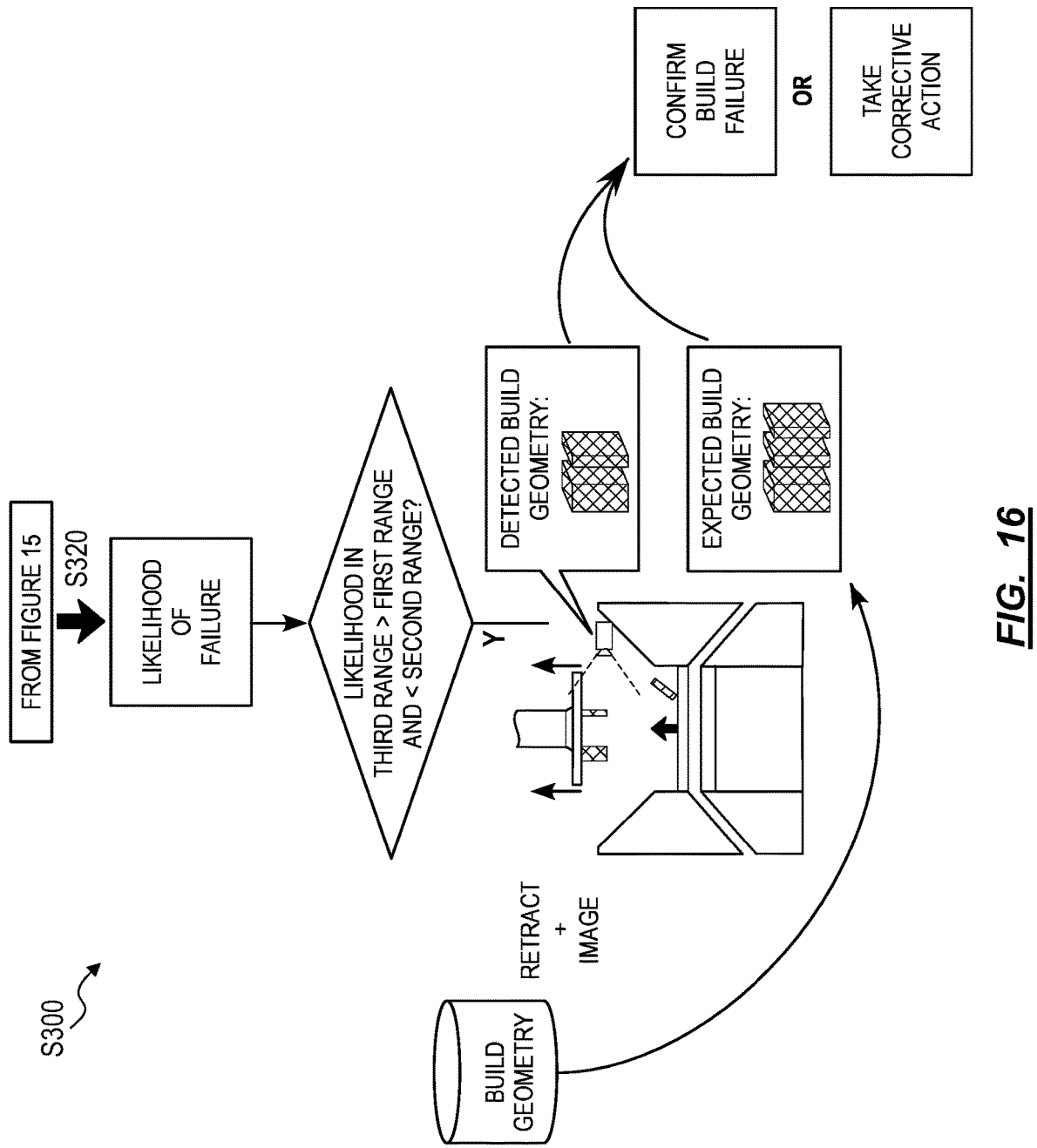
FIG. 16 is a flowchart representation of one variation of the second method.

As shown in FIG. 16, in one implementation in which the system 100 includes a visual light image sensor within the build chamber, the system 100 can, in response to calculating a likelihood of failure within another likelihood range (e.g., 70-90%) greater than the likelihood range corresponding to flagging the build: record an image of the build via the image sensor; estimate a first dimension of the build based on the image; access a first target dimension from a build geometry file representing a target geometry for the build, the first target dimension corresponding to the first dimension; calculate a dimensional error between the first dimension and the first target dimension; and in response to the dimensional error exceeding a threshold error, pause the additive manufacturing process. Thus, the system 100 can achieve greater certainty regarding the build failure by visually analyzing the build, thereby autonomously confirming failure without requiring notification of an operator.

The system 100 can detect the three-dimensional geometry of the build by recording a set of images of the build and estimating the three-dimensional geometry of the build based on these images. The system 100 can then detect deviations between the estimated three-dimensional geometry of the build and the target geometry by calculating deviations between the estimated three-dimensional geometry (e.g., represented as a three-dimensional point cloud or depth map) and the initial STL file being utilized to manufacture the build. If the deviation between the estimated three-dimensional geometry of the build and the target geometry exceeds a deviation threshold, the system 100 can detect that the build has failed. Additionally or alternatively, the system 100 can attempt to correct the geometry of the prior layer during which the system 100 detected build failure. For example, the system can repeat the build cycle with modified build parameters and re-expose the current layer especially around edges of the geometry of the layer in order to improve the dimensional accuracy of the prior layer. In another example, the system 100 can modify the electromagnetic energy distribution of the subsequent layer in order to correct anomalies detected in the prior layer (e.g., by increasing the exposure duration according to curing characteristics of the resin).

In one implementation, the system 100 can estimate three-dimensional surfaces and edges based on the three-dimensional point cloud and/or depth map of the build in order to measure deviation between the target surface geometry of build and the estimated surface geometry of the build. Alternatively, the system 100 can calculate a three-dimensional point cloud based on the target geometry of the build can calculate a similarity or dissimilarity score between the estimated three-dimensional point cloud and the target three-dimensional point cloud.

Additionally or alternatively, the system 100 can execute a simplified test by, via the visible-light image sensors, estimating the height of the build; and detecting a deviation between the estimated height with the target height of the build (given the number of layers photocured so far in the additive manufacturing process). The system 100 can then calculate a deviation between the estimated height and the target height. The system 100 can then detect a build failure in response to calculating greater than a threshold deviation between the estimated height and the target height.

In one implementation, the system 100 can retract the build platform to position the build within a field of view of the image sensor prior to recording one or more images of the build. For example, the system 100 can retract the build platform 106 to distance from the build window in excess of the target retraction distance in order to bring a larger portion of the build into the field of view of the image sensor. Thus, the system 100 can generate a more complete three-dimensional representation of the build via additional retraction of the build platform.

14.2.3 Pause Print and Notify Operator

Generally, the system 100 can, in response to calculating the second likelihood of failure within a likelihood range greater than the likelihood range associated with flagging the build: pausing the additive manufacturing process in Block S340; and notifying an operator of the second likelihood of failure in Block S350. Thus, the system 100, in instances in which a high likelihood of failure is detected (e.g., greater than 90%) the system can immediately pause the build and notify an operator of the system. The operator of the system can include persons responsible for manufacturing the build and/or an automated electromechanical system configured to initiate or extract builds from the system 100 and/or to perform maintenance on the system 100.

Upon calculating a high likelihood of build failure, the system 100 can automatically pause the additive manufacturing process in order to prevent further expenditure of machine time and/or manufacturing resources on the current build. More specifically, the system 100 can cease advancement of the build platform upon retraction of the build platform 106 from the build window 110. In one example, the system 100 can also begin venting the build chamber or draining resin from the build tray in order to prepare the system for access by an operator.

In one implementation, the system 100 can prompt a user of the system 100 to verify that the build has failed before permanently halting the additive manufacturing process. For example, the system 100 can transmit a notification to an operator's mobile device (e.g., smartphone, tablet, computer) as designated within the system 100. Alternatively, the system 100 can transmit the notification to a web interface or other online interface viewable by the operator. In another example, the system 100 can display the notification directly within a user interface of the system 100 itself such that an operator monitoring the system 100 can identify that a build failure is likely to have occurred.

In another implementation, the system 100 can generate a report exposing the underlying anomalous data that caused the failure detection model to calculate a high likelihood of build failure. For example, the system 100 can generate a report, viewable to an operator of the system 100 identifying a deviation between the predicted temperature distribution and the measured temperature deviation (via thermographic images recorded by a thermographic image sensor), a report identifying a deviation between the estimated geometry and the target geometry (via images from the visible light image sensor, or a report identify a rapid change in the force profile between build cycles with a similar build geometry. Thus, the system 100 can enable an operator to quickly diagnose the cause of the build failure and adjust build settings or the build geometry to increase the probability of success of future builds.

In yet another implementation, the system 100 can identify whether the build failure occurred due to a maintenance issue with the system 100 and, if so, the system 100 can automatically notify an operator to provide inspection or service the system 100.

Additionally or alternatively, the system 100 can detect whether the build failure occurred due to anomalous conditions within the build chamber or resin reservoir (e.g., an excessively high temperature, oxygen content) and can pause the build while monitoring conditions within the build chamber. In response to detecting the conditions within the build chamber return to normal levels, the system 100 can initiate the subsequent build cycle of the build. Alternatively, in response to detecting continued presence of the anomalous conditions within the build chamber (e.g., for longer than a threshold duration), the system 100 can permanently halt the build and notify an operator that the build has failed.

15. Failure Prevention Model

Generally, the system 100 or a remote computer system communicating with the system 100 can execute a failure prevention model in order to prevent future build failures given similar build materials and conditions within the build chamber. More specifically, the system 100 can generate a set of training examples for the failure prevention model by executing a number of additive manufacturing processes S100 across one or more instances of the system 100 and recording both successful and failed builds. Thus, the system 100 can: label each build record with the build material used for the build, the target build characteristics of the build, and a failure label indicating whether the build failed, was completed, or was out of tolerance; and upload the labelled build record for the build in association with the geometry of the build to a central repository. Once the system 100 uploads the build records representing a corpus of builds to the central repository, the remote computer system can perform machine learning techniques to detect patterns in the build records of the builds.

The system 100 can then access a most recent version of the failure prevention model and modify parameters of the aforementioned interlayer feedback model to prevent failure of future builds manufactured by the system 100 or other instances of the system 100. The failure prevention model can output a set of build parameters or build parameter limits that override or constrain the outputs of the interlayer feedback model in order to prevent failure of a build.

In one implementation, the system 100 or a remote computer system can share updated build parameters or an updated version of the failure prevention model with instances of the system 100 that are executing the same build concurrently. Thus, upon detecting build failure caused by sub-optimal build parameters at a first instance of the system 100, the first instance of the system 100 can communicate with a second instance of the system 100 to transmit updated build parameters for the build to avoid a similar build failure.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. An additive manufacturing system comprising:
a build window;
a projection system:
arranged beneath a lower surface of the build window; and
configured to project electromagnetic radiation toward an upper surface of the build window;
a build platform:
facing the build window; and
configured to retract and advance relative to the build window;
a sensor suite comprising a load cell configured to record forces applied to the build platform during an additive manufacturing process; and
a controller configured to:
during a build cycle of the additive manufacturing process for manufacturing a build;
control the projection system to selectively photo-cure a layer of the build between the build platform and the separation membrane, the layer of the build adhered to the build platform;
control the build platform to retract the layer of the build from the build window;
control the sensor suite to sample a set of sensor data streams, the set of sensor data streams comprising a force profile sampled via the load cell;
access a target force profile representing a target retraction of the build platform from the build window;
access a retraction failure detection model;
calculate, via the retraction failure detection model, the likelihood of failure of the build based on the target force profile and the set of sensor data streams comprising the force profile by:
identifying a first peak force during an initial separation stage and a second peak force during a vector peeling stage based on the force profile; and
calculating the likelihood of failure of the build based on the target force profile, the first peak force during the initial separation stage and the second peak force during the vector peeling stage;
calculate a likelihood of failure of the build based on the set of sensor data streams comprising the force profile;
in response to calculating the likelihood of failure within a first likelihood range, flag the build to indicate the likelihood of failure; and
in response to calculating the likelihood of failure within a second likelihood range greater than the first likelihood range:
pause the additive manufacturing process; and
notify an operator of the additive manufacturing system of the likelihood of failure.

2. The additive manufacturing system of claim 1, wherein the controller is configured to calculate, via the retraction failure detection model, the likelihood of failure of the build based on the target force profile and the set of sensor data streams by:
identifying an initial separation stage duration and a vector peeling stage duration based on the force profile; and
calculating, via the retraction failure detection model, the likelihood of failure of the build based on the target force profile, the initial separation stage duration, and the vector peeling stage duration.

* * * * *